United States Patent [19]
Quincey et al.

[11] Patent Number: 5,305,627
[45] Date of Patent: Apr. 26, 1994

[54] SPLIT SLEEVE COLD EXPANSION

[75] Inventors: Darryl E. Quincey, Seattle; Charles M. Copple, Kent; William B. Walsh, Seattle; Richard Z. Jarzebowicz, Kirkland; Eric T. Easterbrook, Kent, all of Wash.

[73] Assignee: Fatigue Technology, Inc., Seattle, Wash.

[21] Appl. No.: 920,602

[22] Filed: Jul. 27, 1992

[51] Int. Cl.$^5$ .................................................. B21D 39/08
[52] U.S. Cl. ................................................. 72/370; 72/391.2
[58] Field of Search ................... 72/370, 391.2, 391.4, 72/391.6, 453.02, 453.05; 29/243.518, 243.519; 206/346, 347, 485

[56] References Cited

U.S. PATENT DOCUMENTS

| | | | |
|---|---|---|---|
| 3,566,662 | 3/1971 | Champoux | 72/370 |
| 3,892,121 | 7/1975 | Champoux et al. | 72/393 |
| 4,187,708 | 2/1980 | Champoux | 72/30 |
| 4,423,619 | 1/1984 | Champoux | 72/393 |
| 4,425,780 | 1/1984 | Champoux | 72/370 |
| 4,471,643 | 9/1984 | Champoux et al. | 72/391 |
| 4,524,600 | 6/1985 | Champoux et al. | 72/391 |
| 4,557,033 | 12/1985 | Champoux | 29/525 |
| 4,583,388 | 4/1986 | Hogenhout | 72/393 |
| 4,606,455 | 8/1986 | Grikis et al. | 206/485 |
| 4,640,114 | 2/1987 | Kuless | 72/370 |
| 5,090,607 | 2/1992 | Ohuchi et al. | 206/347 |

FOREIGN PATENT DOCUMENTS 388117  9/1990  European Pat. Off. ........... 72/391.4

*Primary Examiner*—Lowell A. Larson
*Attorney, Agent, or Firm*—Delbert J. Barnard

[57] ABSTRACT

An internally lubricated, longitudinally split sleeve is positioned on a small diameter portion a mandrel having a rear end connected to a piston with a puller tool. The rear end of the split sleeve is flared and is against the front end of a tubular sleeve stop which immediately surrounds the mandrel. The puller tool includes a tubular sleeve holder which surrounds the sleeve stop. A forward main portion of the sleeve holder is separated by a pair of longitudinal slots into a pair of elongated fingers. The forward ends of the fingers define a sleeve and mandrel receiving end opening and jaws radially outwardly bounding the opening. The mandrel and sleeve holder are both extended and then the puller tool is moved into alignment with a sleeve and is moved endwise to push the mandrel through the sleeve until the flared end of the sleeve is against the sleeve stop. Then the sleeve holder is retracted. Next, the mandrel and sleeve are inserted into a hole in a workpiece and the tool is moved forwardly until the front ends of the jaws are against the workpiece. Then, the puller tool is operated to retract the mandrel through the sleeve and into the sleeve stop. Retraction of the mandrel moves first an increasing diameter portion of the mandrel and then a maximum diameter portion of the mandrel through the sleeve which radially expands the sleeve and cold expands the material immediately surrounding the hole in the workpiece. After the mandrel is retracted into the sleeve stop, the puller tool is moved away from the workpiece. The jaws of the sleeve holder engage and retain the sleeve so that the sleeve is pulled out from the hole in the workpiece.

58 Claims, 22 Drawing Sheets

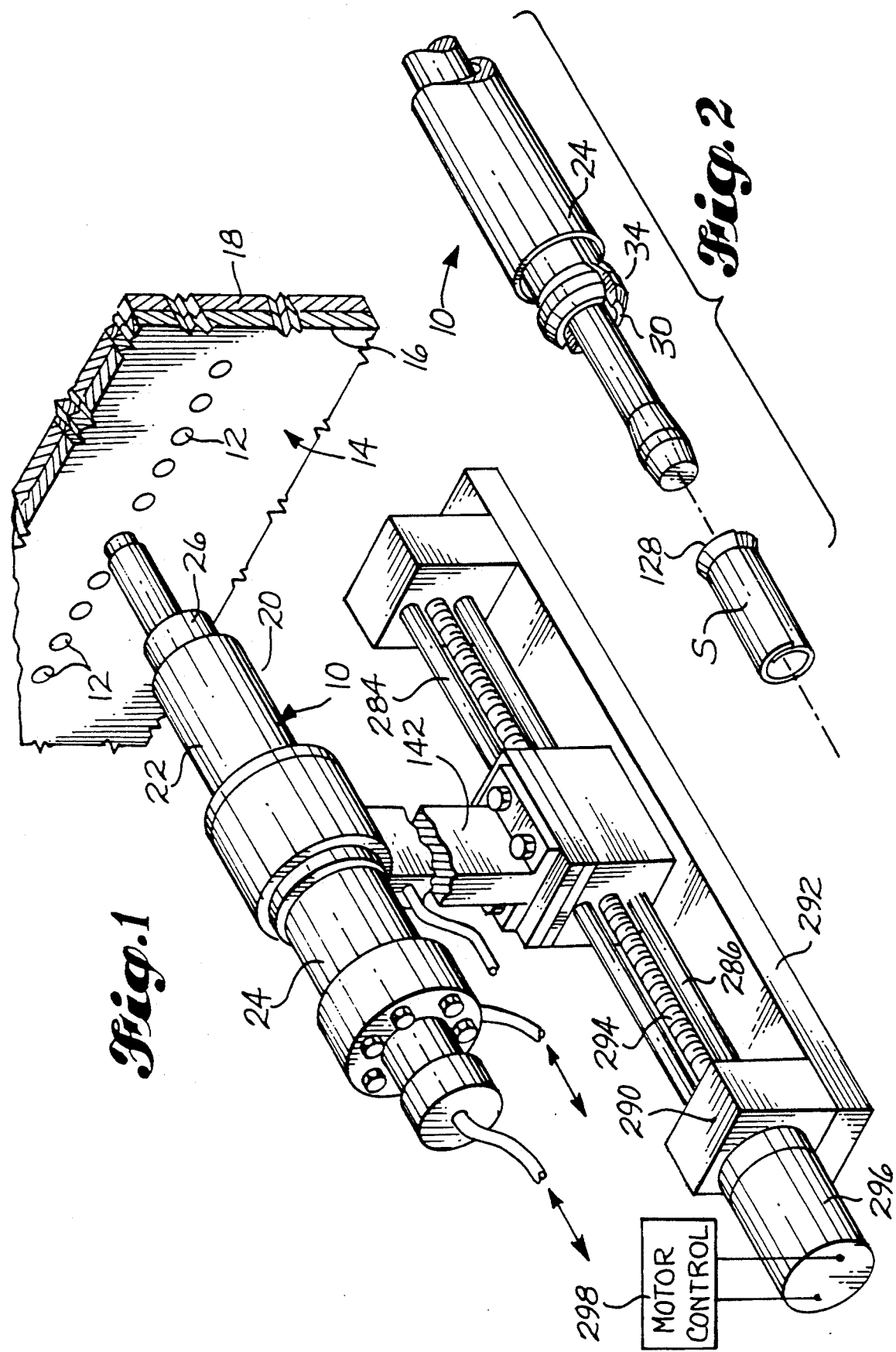

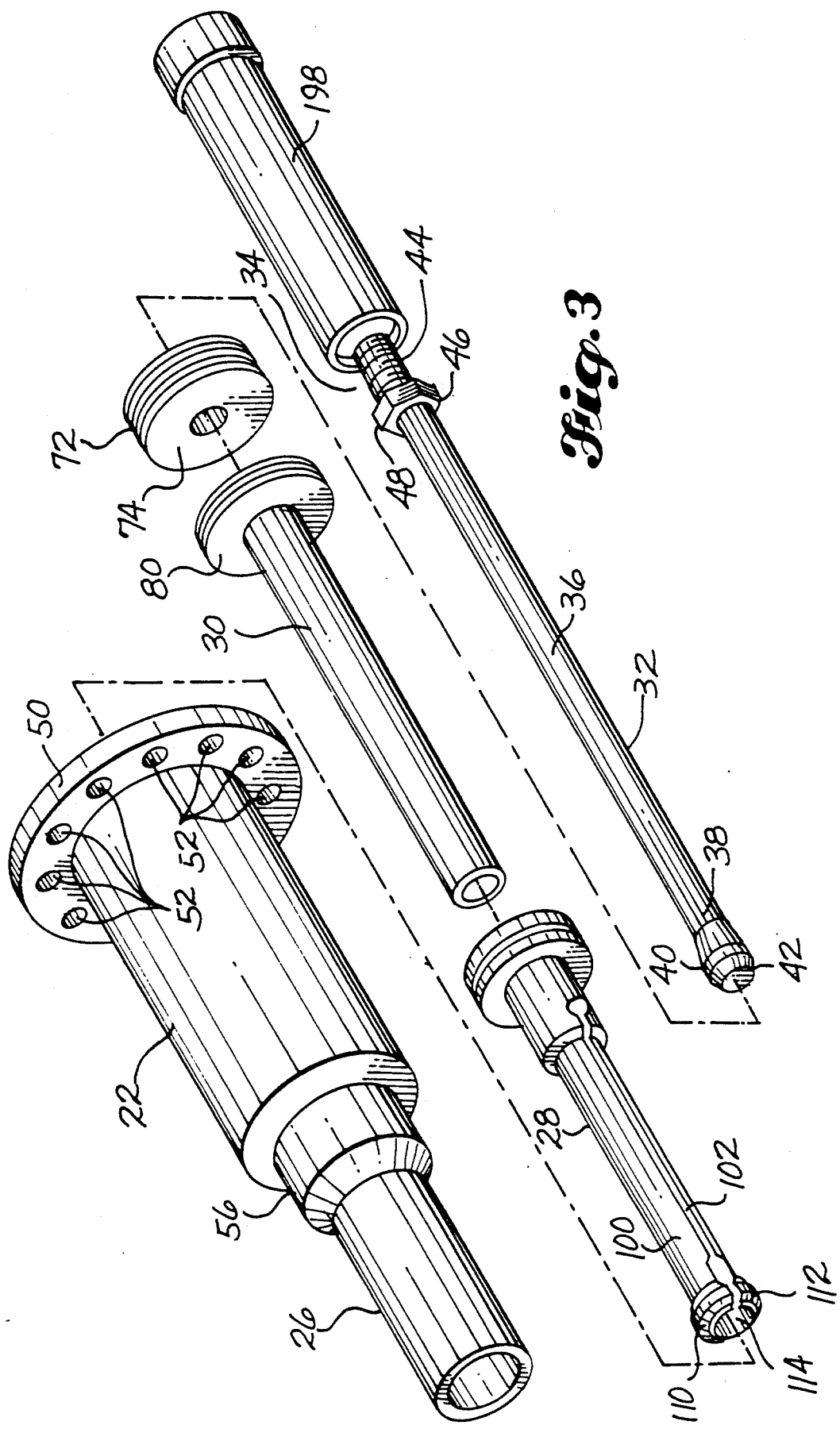

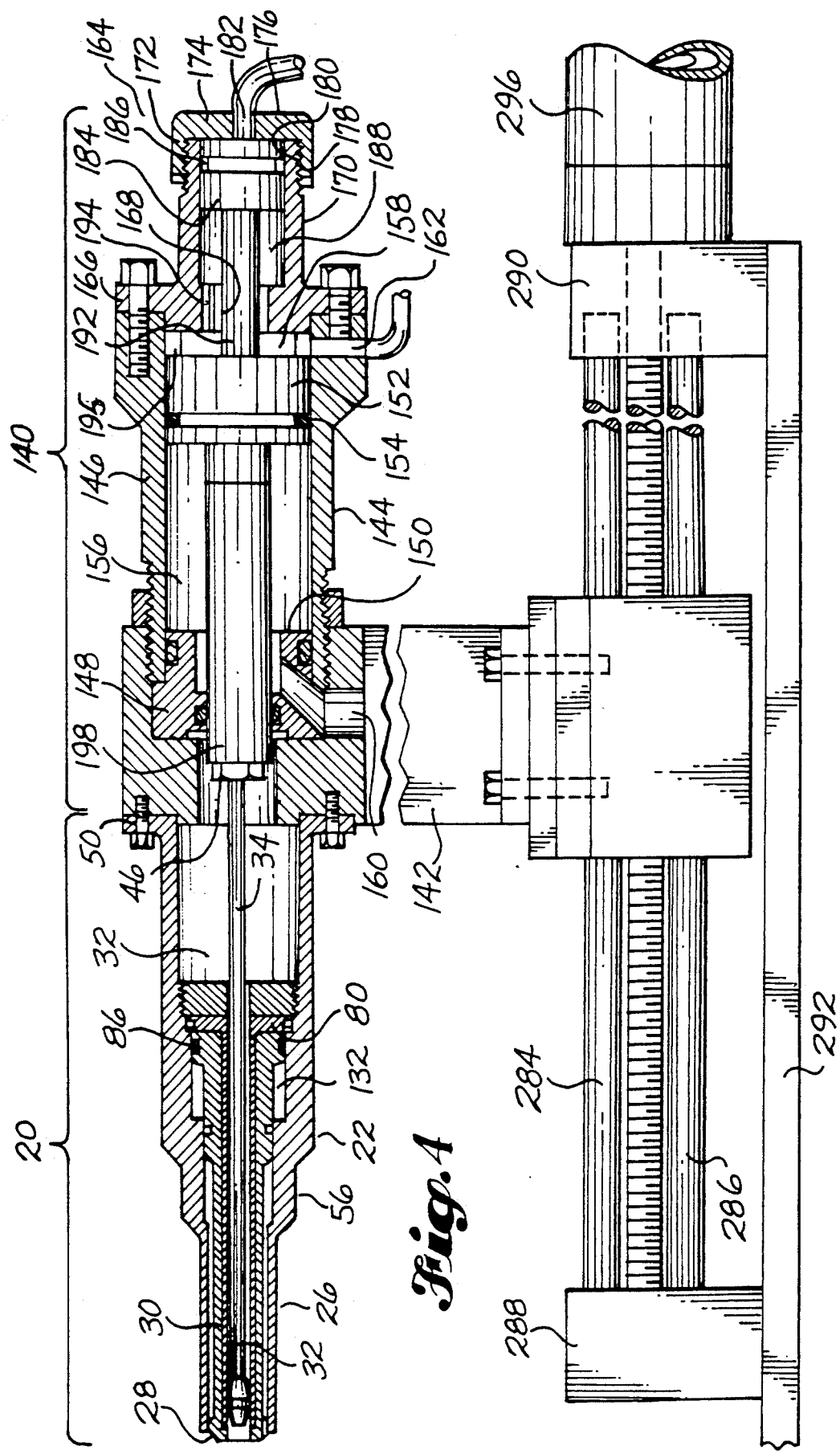

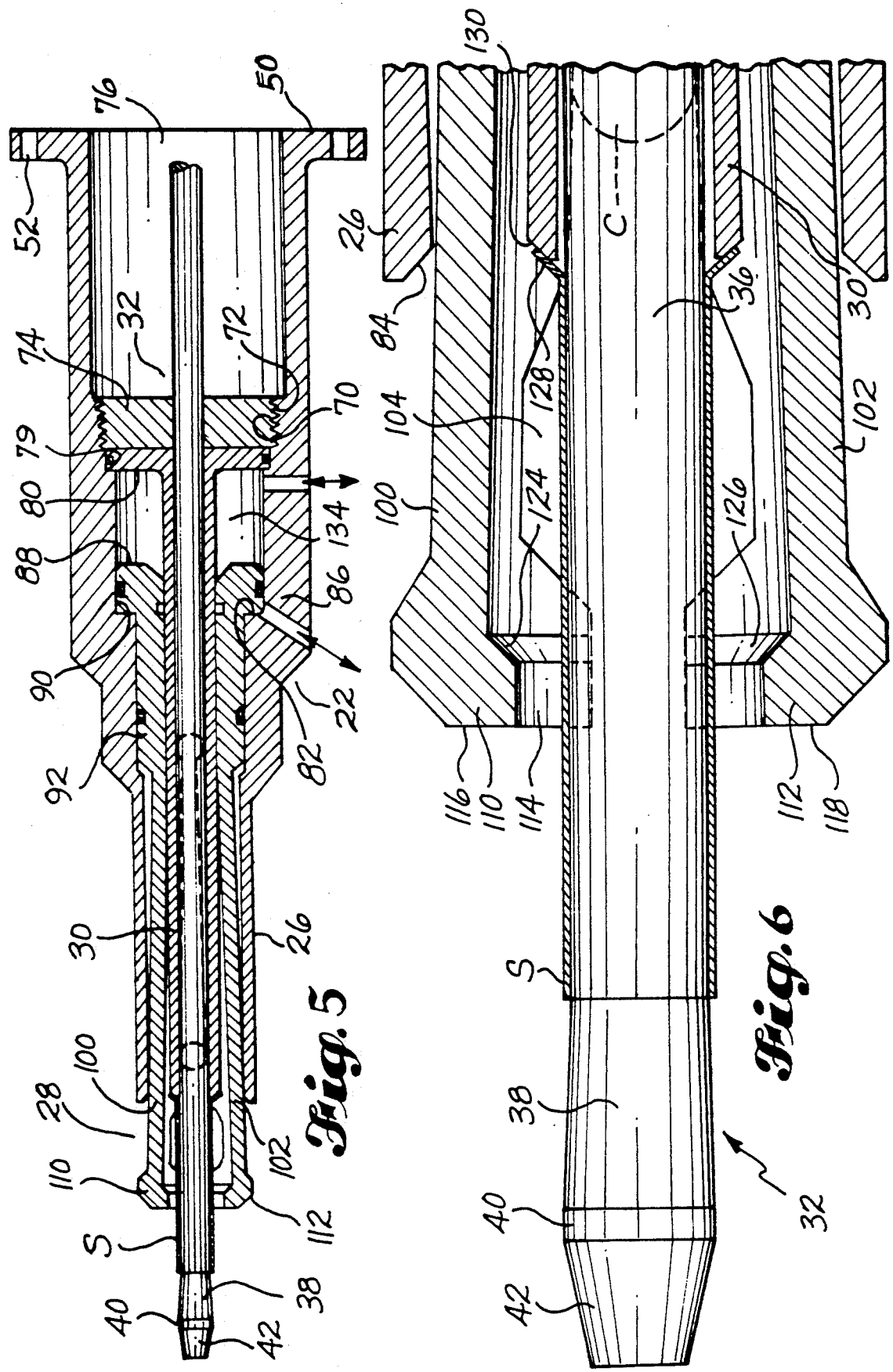

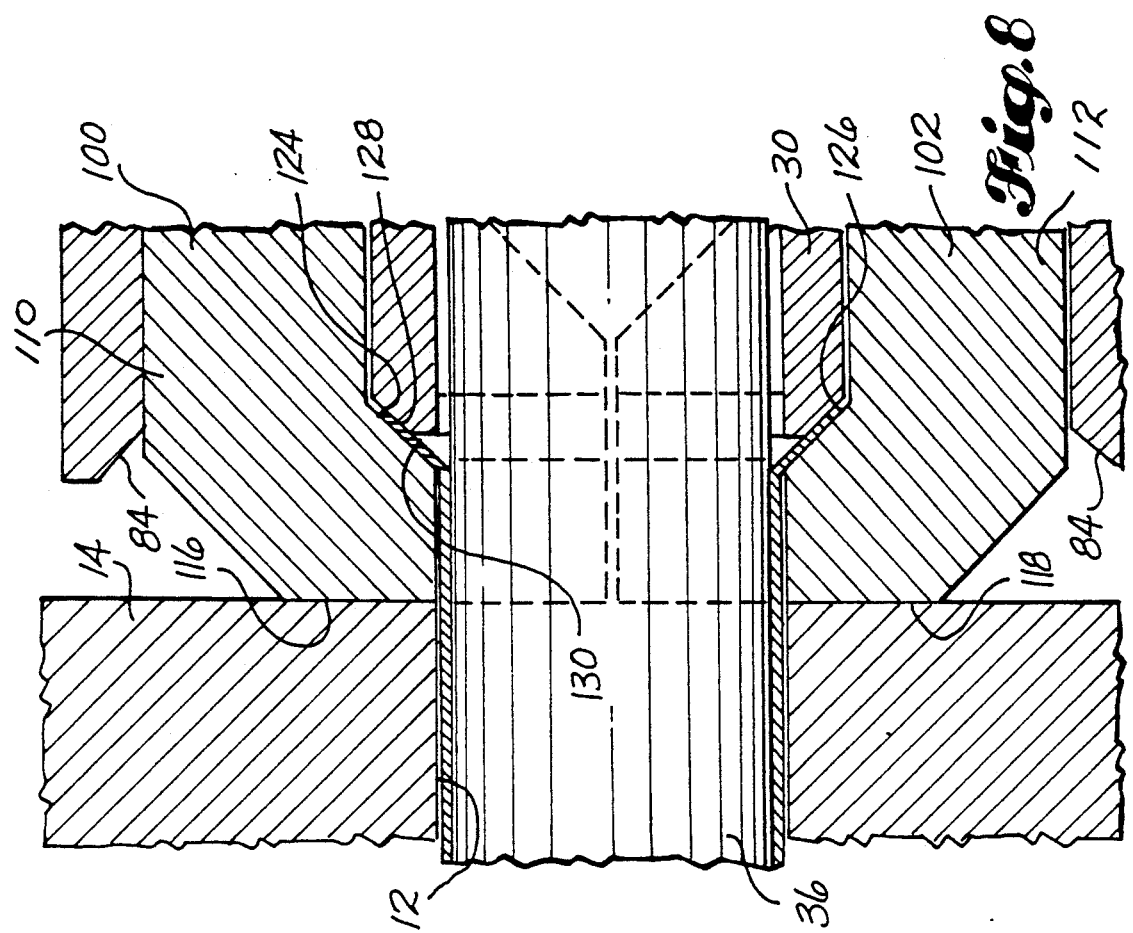
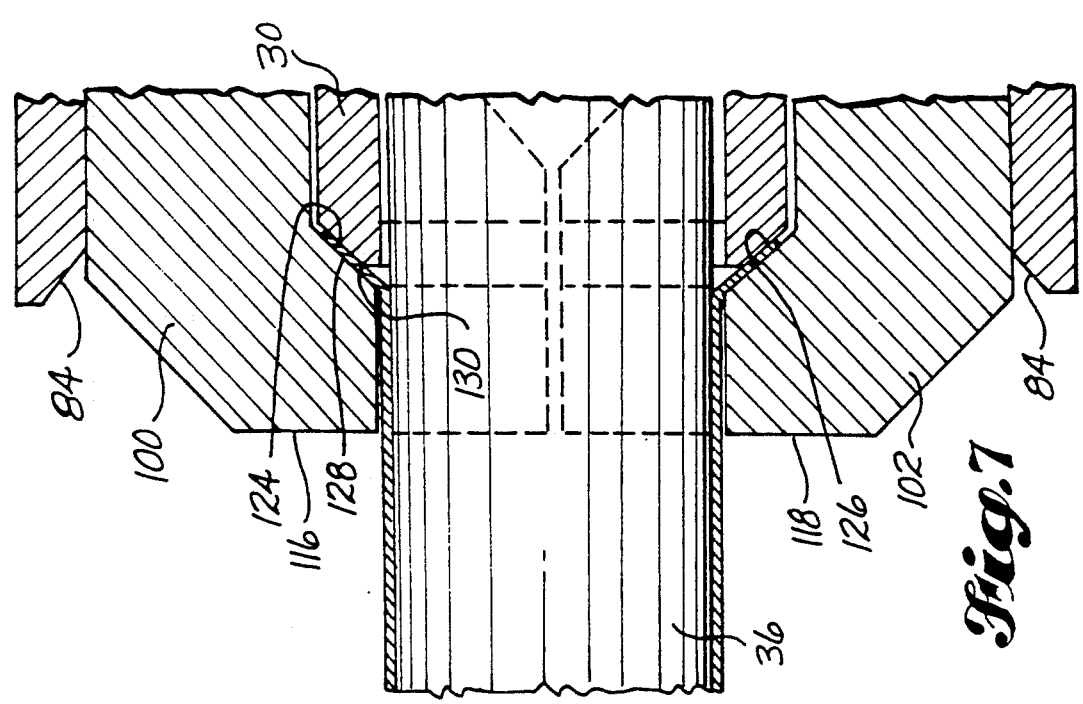

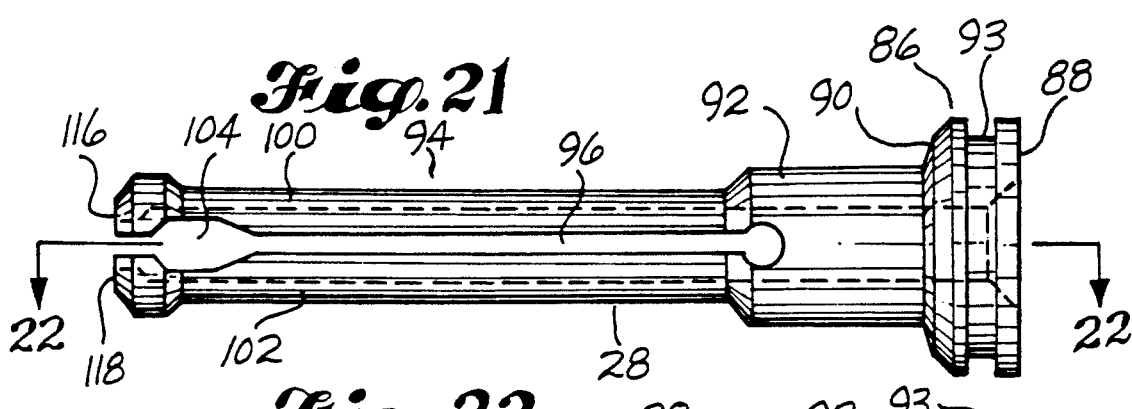
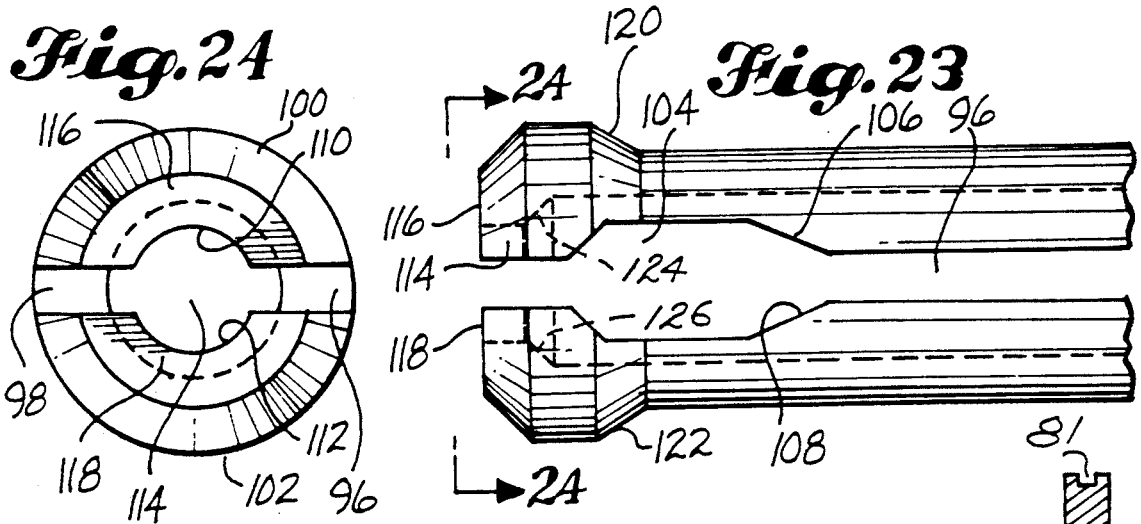
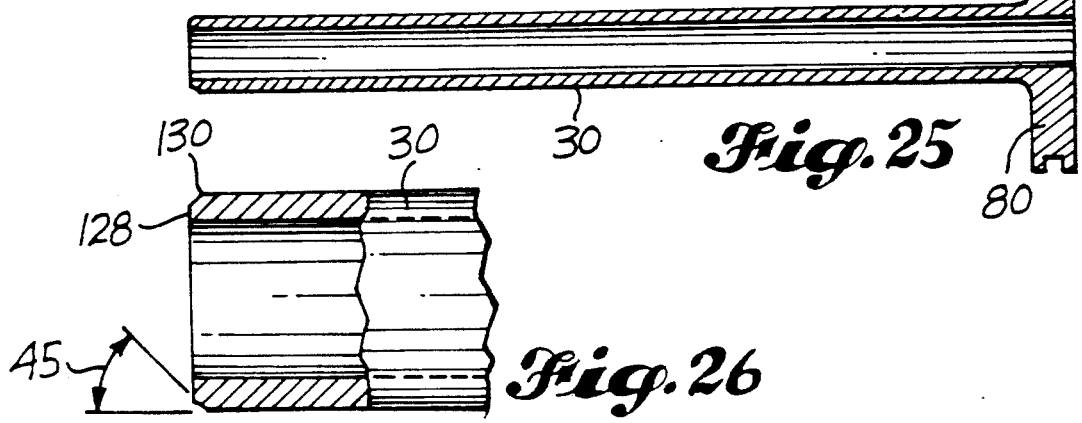

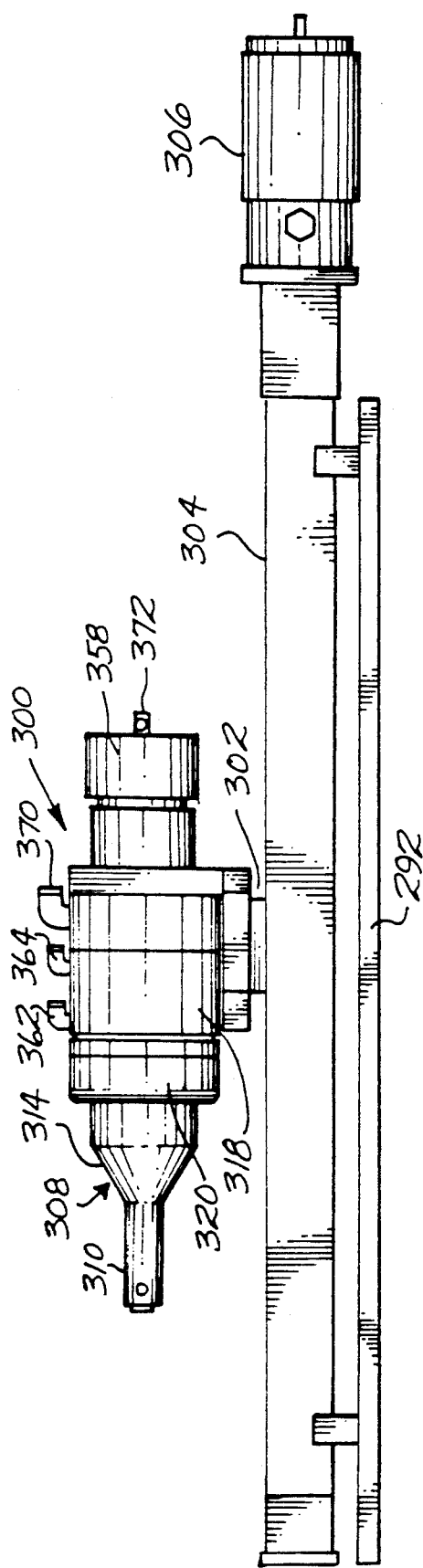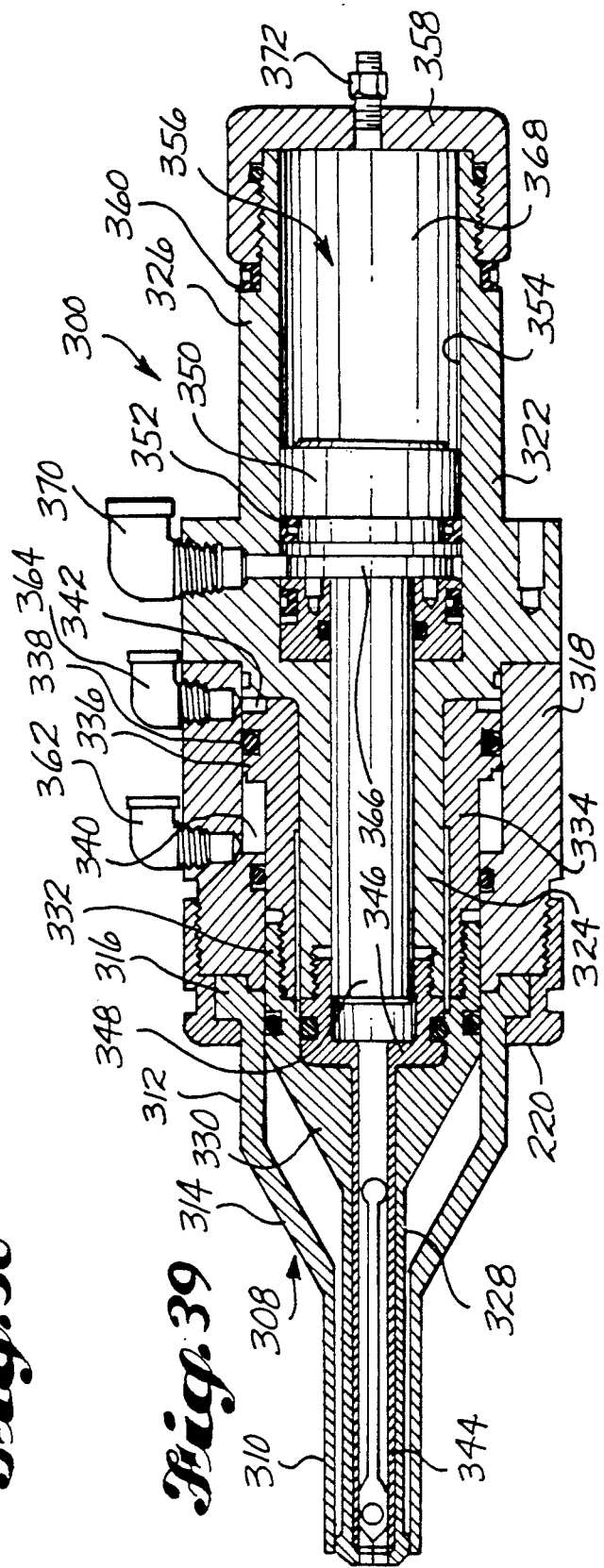
Fig.38
Fig.39

SPLIT SLEEVE COLD EXPANSION

TECHNICAL FIELD

This invention relates to split sleeve cold expansion, including but not limited to cold expansion of fastener holes and the like, for fatigue life enhancement. More particularly, it relates to the provision of a method and apparatus for quickly and easily installing a split sleeve on a mandrel, prior to old expansion, and quickly and easily removing the sleeve from a hole in a member, following cold expansion.

BACKGROUND INFORMATION

Split sleeve cold expansion of fastener holes and other openings in structural members is a process in which a tapered mandrel is used in conjunction with a disposable, internally lubricated split sleeve, to compressively prestress a significant zone in the material surrounding the opening. This compressive prestressing offsets the stress concentration of the hole itself to produce substantial improvement in structural fatigue performance of the material on which the opening is formed.

Split sleeve cold expansion is most often performed on one side of the workpiece. The mandrel has a rear end portion which is connected to a piston within a puller tool. Starting from the rear end, and moving forwardly, the mandrel includes in order, a small diameter portion, an increasing diameter portion and a maximum diameter portion. The piston is retractable to retract the mandrel and is extendible to extend the mandrel. A split sleeve is moved endwise over the maximum and increasing diameter portions of the mandrel and onto the small diameter portion of the mandrel. The split in the sleeve allows the sleeve to expand as it is moved relatively over the maximum in creasing diameter portions of the mandrel. When the sleeve is on the small diameter portion of the mandrel it is contracted and has an outside diameter equal to or slightly smaller than the maximum diameter portion of the mandrel. The maximum diameter portion of the mandrel is sized to fit through a workpiece opening that is to be expanded. The split sleeve, while in a contracted position on the small diameter portion of the mandrel, is also fittable through the workpiece opening.

As a first step of a cold expansion method, as it has been practiced to date, a mandrel is extended out from the puller tool. Then, a split sleeve is hand installed onto the mandrel and is moved onto the exposed portion of the small diameter portion of the mandrel. Then the puller tool is hand moved to align the maximum diameter portion of the mandrel with the hole in the workpiece. Next, the puller tool is hand moved endwise to move the mandrel and sleeve into the hole. This endwise movement of the puller tool is continued until the split sleeve is within the hole and a nose piece on the puller tool is against the workpiece. The puller tool is then operated to retract the piston and the mandrel. Movement of first the increasing diameter portion and then the maximum diameter portion of the mandrel through the split sleeve causes another expansion of the split sleeve. The split sleeve thickness is significantly greater than the clearance between the maximum diameter portion of the mandrel and the wall of the workpiece opening. As a result, movement of the in creasing and maximum diameter portions of the mandrel through the split sleeve poses on the split sleeve a radially outward which acts on the workpiece material immediately surrounding the opening and increases the diameter of the opening. The diameter of the opening is increased a significant amount to introduce a compressive hoop prestress into the material surrounding the opening. The puller tool is operated to pull the mandrel completely through the split sleeve. Then, the puller tool is hand pulled by the operator away from the workpiece while the split sleeve remains in the workpiece. After cold expansion, and after movement of the puller tool and mandrel away from the workpiece, the used sleeve is removed from the opening as an additional step.

A principal object of the present invention is to provide a method and apparatus for facilitating the placement of a split sleeve on a mandrel, prior to cold working, and for easily and automatically removing the used sleeve from the hole following cold expansion, in response to movement of the puller tool and mandrel away from the workpiece.

The prior art processes and tooling are described in detail U.S. Pat. No. 3,566,662, granted Mar. 2, 1971, to Louis A. Champoux; U.S. Pat. No. 4,187,708, granted Feb. 12, 1980, to Louis A. Champoux; and U.S. Pat. No. 4,425,780, granted Jan. 17, 1984, to Louis A. Champoux. U.S. Pat. No. 4,583,388, granted Apr. 22, 1986, to Franciscus Hogenhout, discloses a puller tool for a split mandrel. The above patents, and the following additional U.S. patents, should be considered for the purpose of putting the present invention into proper perspective relative to the prior art. U.S. Pat. No. 3,892,121, granted Jul. 1, 1975, to Louis A. Champoux, Horace E. Hill and Joseph L. Phillips; U.S. Pat. No. 4,423,619, granted Jan. 3, 1984, to Louis A. Champoux; U.S. Pat. No. 4,471,643, granted Sep. 18, 1984, to Louis A. Champoux and Charles M. Copple; U.S. Pat. No. 4,524,600, granted Jun. 25, 1985, to Robert L. Champoux and Charles M. Copple; and U.S. Pat. No. 4,557,033, granted Dec. 10, 1985 to Robert L. Champoux.

DISCLOSURE OF THE INVENTION

One aspect of the invention is to provide a puller tool which includes an elongated tubular nose portion having a front end. An elongated tubular sleeve holder is positioned within the nose portion of the puller tool. An elongated tubular sleeve stop is positioned within the sleeve holder. An elongated mandrel is provided to extend through the sleeve stop. The mandrel includes in order, from rear to front, a rear end portion, a small diameter portion, an increasing diameter portion, and a maximum diameter portion. The sleeve holder includes a circumferentially continuous rear portion and an elongated, axially slotted front portion extending axially forwardly from said rear end portion. The front portion includes a plurality of axial fingers separated by slots. The fingers have front end portions which define a front end opening and sleeve receiving jaws radially outwardly bounding the end opening. The jaws are positioned axially forwardly of the front end of the sleeve stop. The sleeve holder is movable axially between a retracted position, Wherein said jaws are located at least partially within the nose portion of the tool, and are radially contracted, and an extended position wherein the jaws are positioned axially forwardly of the nose portion, and are radially expanded. The rear end portion of the mandrel is connected to a piston within the puller tool. The piston is extendible and retractable for extending and retracting the mandrel. The mandrel has an extended position in which its maximum and increasing diameter portions, and a part of its small diameter portion, are positioned endwise forwardly of the sleeve stop. This enables placement of a split sleeve onto the exposed small diameter portion of the mandrel.

In preferred form, a split sleeve is supported in a fixed position and the puller tool and mandrel are moved to it. The puller tool and its support are moved together to place the mandrel in axial alignment with the sleeve. Then, the puller tool is moved axially along its support to insert the mandrel into and through the sleeve. After the sleeve is on the mandrel, the sleeve holder is retracted to grip the sleeve. Then, the puller tool and its support are moved over to a workpiece. The support is moved to position the mandrel in axial alignment with a hole in the workpiece. Then, the puller tool is extended to place the mandrel and sleeve into the hole in the workpiece. The puller tool is moved forwardly until the front end surfaces of the jaws of the sleeve holder are in contact with the workpiece. Then, the puller tool is operated to retract the mandrel through the sleeve and into the tubular nose portion of the mandrel. Movement of the mandrel through the sleeve radially expands the sleeve and cold expands the material surrounding the hole. Following cold expansion, the puller tool is moved away from the workpiece. This pulls the sleeve out from the hole because the jaws of the sleeve holder make gripping contact with a rear end portion of the sleeve. The puller tool is moved to a sleeve removal station whereat the sleeve holder is extended. Extension of the sleeve holder causes a radial expansion of the jaws and releases the jaws from the sleeve. In response, the sleeve contracts. Then the mandrel is extended again into contact with the rear end portion of the sleeve. This moves the sleeve out from the end opening, free of the sleeve holder.

The present invention allows the puller tool to be mounted on a track and the track and tool to be moved relative to a workpiece by a computer controlled robot. A computer can be used to move the track and the tool to a station where a split sleeve is supported for loading onto the mandrel. The track can be positioned to align the mandrel with the sleeve. Then, the puller tool can be extended to move along the track, to insert the mandrel through the split sleeve. The puller tool can then be retracted along the track and the robot can be operated to move the track and puller tool over to a position with the sleeve carrying mandrel in alignment with a hole in a workpiece. Then, the puller tool can be moved forwardly along the track to place the mandrel and sleeve within the hole and place the forward end surfaces of the jaws of the sleeve holder into contact with the workpiece. Then, a command signal from the computer can operate the puller tool to retract the mandrel through the sleeve, to in that manner radially expand the sleeve. Following sleeve expansion, a computer signal can be used to move the puller tool away from the workpiece, and at the same time withdraw the used sleeve from the opening in the workpiece. A computer command can move the track and the puller tool over to a sleeve disposal station. At the sleeve disposal station the sleeve holder can be extended to release its grip on the sleeve and the mandrel can be again extended, this time to push the sleeve out from the end opening in the sleeve holder, free of the sleeve. Then, the robot can be operated by a computer command to move over to pick up another sleeve, to start the process again for the next hole in the workpiece.

According to an aspect of the invention, a sleeve holder is provided which includes cam elements for radially expanding and contracting the jaws of the sleeve holder in response to an axial extension and retraction of the sleeve holder.

An important aspect of the invention is to provide a sleeve holder which securely grips the rear end portion of an axially split sleeve without interfering with mandrel movement through the sleeve and into the puller tool free of the sleeve.

The present invention provides an easy and quick release of the sleeve, by a simple extension of the sleeve holder, and provides an easy and quick removal of the used sleeve from the sleeve holder, by a simple extension of the mandrel. After the mandrel has been fully retracted through the sleeve and into the forward portion of the puller tool, and the sleeve holder has been extended, the grip of the sleeve holder on the sleeve is released. In response, the sleeve contracts and in its contracted state the rear end of the sleeve is in the path of the forward or nose portion of the mandrel. Thus, an extension of the mandrel will move the forward or nose portion of the mandrel against the rear end portion of the sleeve, and will push the sleeve out from the sleeve holder.

The puller tool of the present invention includes a main piston to which the mandrel is secured. Hydraulic pressure is delivered into a working chamber forwardly of the main piston, to force the main piston rearwardly and pull the mandrel through the sleeve. In accordance with an aspect of the invention, air pressure is used behind the main piston, to move the piston and the mandrel forwardly. Also, an auxiliary air piston-cylinder unit is provided rearwardly of the mandrel piston, and is operable to extend the mandrel piston and the mandrel a predetermined amount, determined by the length of a piston rod which is a part of the auxiliary piston-cylinder unit. This piston rod extends forwardly from the piston of the auxiliary piston-cylinder unit and through a common wall that separates the main and auxiliary piston-cylinder units. The forward end of this piston rod confronts the rear side of the mandrel piston. When the mandrel piston is retracted, the auxiliary piston can be extended to move its piston rod against the mandrel piston, and move the mandrel piston and the mandrel carried thereby forwardly a distance equal to the stroke length of the auxiliary piston. The auxiliary piston-cylinder unit is used to extend the mandrel an exact distance, prior to movement of the puller tool to insert the mandrel into its sleeve.

The present invention also involves the construction of a preferred embodiment of the puller tool, permitting easy assembly and disassembly of the puller tool.

Another aspect of the invention is to provide an internally lubricated, axially split sleeve having a slight flare at its rear end, with the flared end and an adjacent portion of the sleeve being sized and adapted to be received within the sleeve holder, and retained between the jaws of the sleeve holder and a front end of a sleeve stop.

Yet another aspect of the invention is to provide apparatus for delivering cold expansion sleeves to a holding station, into a position to be picked up by a puller gun. This apparatus includes a housing which defines a longitudinal passageway into which a series of cold expansion sleeves are moved. The sleeves are moved sideways to the sleeve holding station. The passageway includes a longitudinal cam surface confronting the front ends of the sleeves. The cam surface is configured to contact the front ends of each sleeve as the sleeve approaches the holding station, and push such sleeve axially rearwardly. A housing includes a window through which the rear portion of the sleeve extends when it is at the holding station. In preferred form, the housing provides a cradle at the holding station positioned to engage a side portion of the sleeve that is at the holding station.

According to a further aspect of the invention, the delivery apparatus includes a sleeve carrier. In preferred form, the sleeve carrier comprises an elongated web and pairs of tabs spaced apart along the web. Each pair of tabs extend perpendicular from the web in the same direction. Each tab includes an opening in alignment with an opening in the other tab of its pair. Each cold expansion sleeve is associated with a pair of tabs and extends through the openings in its pair of tabs, and is frictionally retained in said openings.

According to another aspect of the invention, the sleeve advance mechanism comprises a support mounted adjacent the housing for movement longitudinally of the housing. The drive means is provided for extending the support towards the holding station and retracting it away from the holding station. An advance finger is mounted on the support for pivotal movement about a pivot axis. The advance finger includes a first end portion which extends from the pivot axis generally into the longitudinal passageway. It also includes a second end portion which extends in the opposite direction from the pivot axis. The support includes a top positioned to be contacted by the second end portion of the advance finger. A spring normally biases the advance finger into a position against the stop When the second end portion of the advance finger is against the stop the first end portion of the advance finger extends laterally across the longitudinal passageway. A retraction of the support will move the first end portion of the advance finger against a sleeve that is in the longitudinal passageway and position one step from the holding station. In response to this contact, the advance finger will rotate in position to allow the first end portion of the advance finger to clear the sleeve. This causes the second end portion of the advance finger to rotate up off the stop against the force of the spring. After the first end portion of the advance finger clears the sleeve the spring moves the advance position back into position with the first end portion of the advance finger spanning across the longitudinal passageway and the second end portion of the advance finger against the stop. The first end portion of the advance finger is located above the sleeve that is at the approach station. An extension of the support moves the first end portion of the advance finger into contact with this sleeve and moves the sleeve down to the sleeve holding station.

Yet another aspect of the invention is to provide a strip of cold expansion sleeves. This strip comprises a flexible plastic carrier including an elongated web and pairs of tabs extending generally perpendicular to the web, from opposite edges of the web. Each tab includes an opening that is in alignment with the opening of the other tab of its pair. A cold expansion sleeve is associated with each pair of tabs. This sleeve extends through the openings in the tabs of the pair. Eaoh cold expansion sleeve is frictionally retained in at least one opening of its pair of tabs. Each cold expansion sleeve is readily moved endwise out from the opening in its pair of tabs, free of the carrier.

Further objects, features and advantages of the invention are hereinafter described in the description of the best mode of the invention.

BRIEF DESCRIPTION OF THE DRAWINGS

Like reference numerals are used to designate like parts throughout the several views of the drawing, and:

FIG. 1 is a pictorial view of a puller tool with its sleeve holder retracted, with an unshown forward end of the sleeve holder positioned against a workpiece, and with an unshown mandrel extending through a fastener hole in the workpiece, the mandrel being in position for retraction back into the pulling tool;

FIG. 2 is an exploded pictorial view showing an internally lubricated, axially split sleeve positioned endwise of a mandrel, and showing the mandrel in an extended position, and showing the sleeve holder which surrounds the mandrel in an axially extended and radially expanded position, and showing a fragmented nose portion of the puller tool housing;

FIG. 3 is an exploded pictorial view of the nose portion of a puller tool, showing the internal components of the tool which are housed within the nose portion;

FIG. 4 is a longitudinal sectional view of an embodiment of the puller tool, such tool being mounted on a track for axial movement along the track;

FIG. 5 is an enlarged scale longitudinal sectional view of a forward portion of the puller tool, such view showing both the mandrel and the sleeve holder extended, showing the jaws of the sleeve holder radially expanded, and showing an internally lubricated, axially split sleeve on a small diameter portion of the mandrel, with a flared rear end of the sleeve against the forward end of a tubular sleeve stop;

FIG. 6 is an enlarged fragmentary view of the left end portion of FIG. 5;

FIG. 7 is a fragmentary longitudinal section view showing the sleeve against the sleeve stop and the jaws of the sleeve holder contracted;

FIG. 8 is a view like FIG. 7 but showing the sleeve and mandrel with a hole in a workpiece;

FIG. 21 is a side elevational view of the sleeve holder shown by FIGS. 3-11;

FIG. 22 is a longitudinal sectional view of the sleeve holder, taken substantially along line 22—22 of FIG. 21;

FIG. 23 is an enlarged scale elevational view of the front end portion of the sleeve holder, showing the jaws and the cam cavity and the cam surfaces of the jaws;

FIG. 24 is an end elevational view of the sleeve holder, taken substantially from the aspect of line 24—24 in FIG. 23;

FIG. 25 is a longitudinal sectional view of the sleeve stop;

FIG. 26 is an enlarged scale fragmentary view of the front end portion of the sleeve stop;

FIG. 38 is a reduced scale view like FIG. 4, but of a modified embodiment, with the parts shown in elevation; and FIG. 39 is a longitudinal sectional view of the puller tool shown in FIG. 38.

BEST MODE FOR CARRYING OUT THE INVENTION

Figure 9:
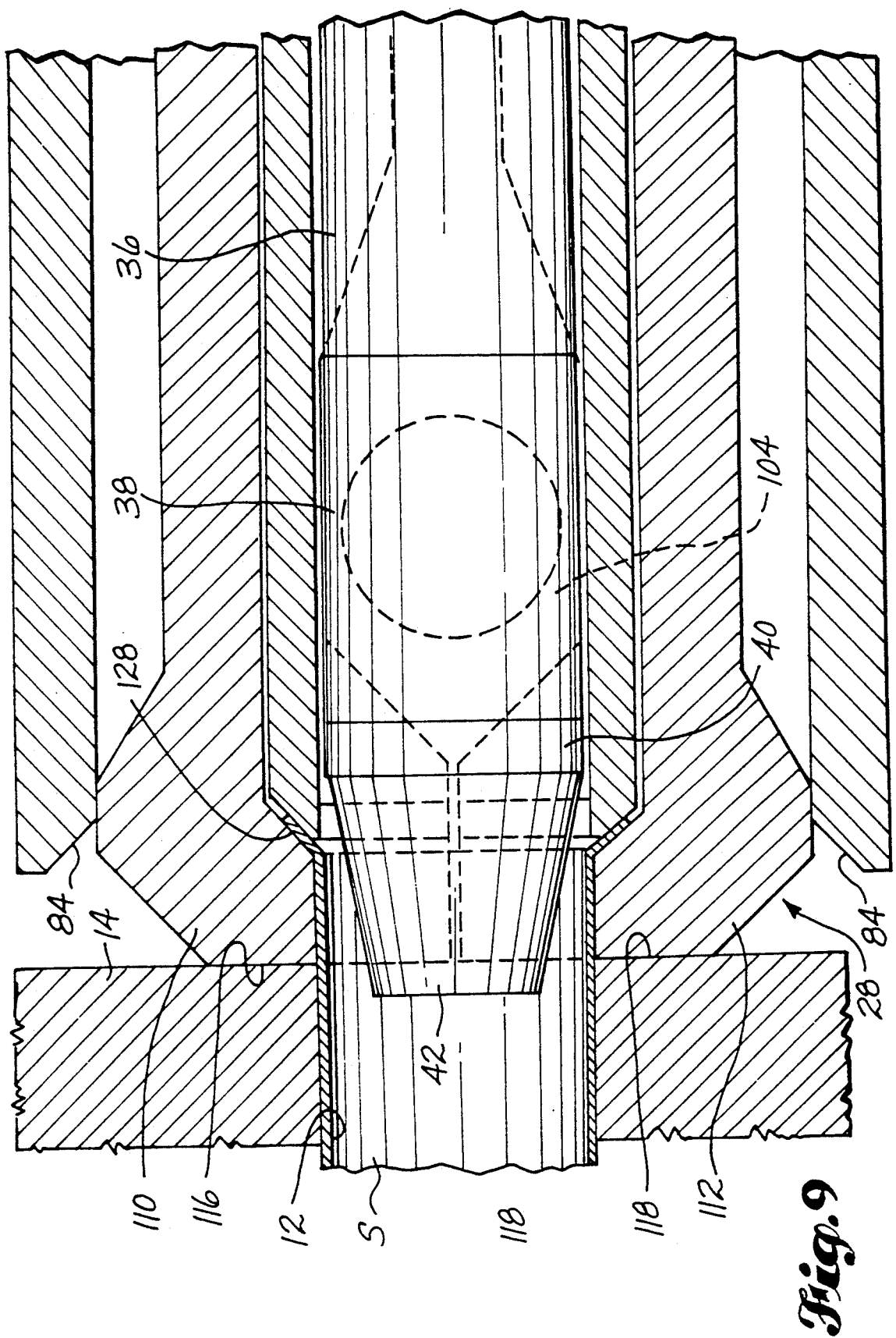
FIG. 9 is a view like FIGS. 7 and 8, but of a large fragment and showing the sleeve holder retracted, showing the forward end portions of the sleeve holder against a workpiece, showing an internally lubricated, axially split sleeve within an opening in the workpiece, showing a flared inner end portion of the sleeve positioned axially between a forward end surface of the tubular sleeve stop and conical inner surface portions of the jaws of the sleeve holder, and showing the mandrel in a retracted position.

Referring to FIG. 1, a puller tool 10 is shown in the process of cold expanding a hole 12 in a workpiece 14. By way of typical and therefore nonlimitive example, the workpiece 14 may constitute a pair of members 16, 18 which are to be secured together by fasteners (bolts, rivets, et o.) which extend through the openings 12. In this example, each opening 12 is actually two openings in axial alignment with each other. One opening is in member 16 and the other is in member 18. Tool 10 includes an elongated housing 20. Housing 20 includes an elongated tubular front portion 22 and an elongated tubular rear portion 24. Front portion 22 includes a nose portion 26. An elongated tubular sleeve holder 28 (FIG. 3) is positioned within the front portion 22. An elongated tubular sleeve stop 30 (FIG. 3) is positioned within the sleeve holder 28. An elongated mandrel 32 is positioned within sleeve stop 30.

Mandrel 32 includes a rear end portion 34, a small diameter portion 36, an increasing diameter portion 38, a maximum diameter portion 40 and a tapered nose portion 42. Mandrel 32 has an extended position in which portions 38, 40 and 42, and a forward end part of portion 36 are positioned forwardly of nose portion 26 and sleeve holder 28. The inner end portion 34 is threaded at 44. A radial flange 46 separates threaded portion 44 and small diameter portion 36. Flange 46 has wrench flats 48 at its outer periphery.

Figure 19:
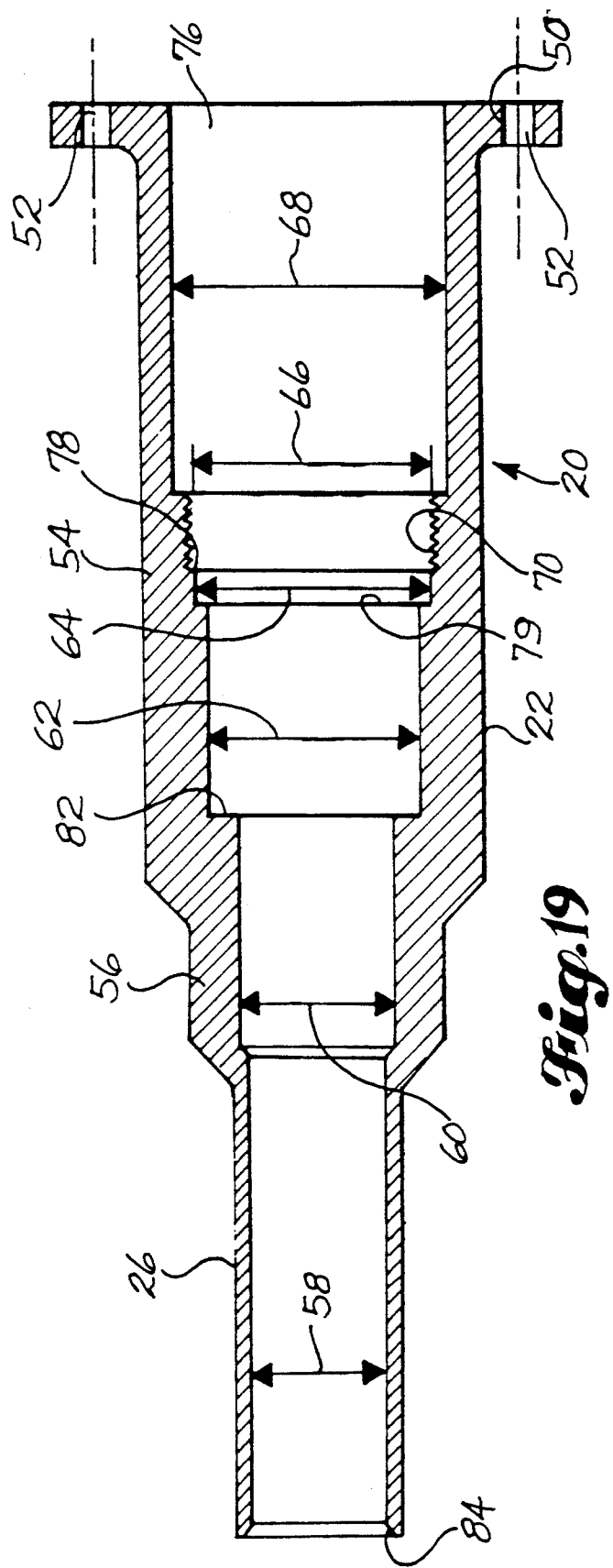
FIG. 19 is an enlarged scale longitudinal sectional view of a member which constitutes the front portion of the illustrated puller tool housing.
Figure 20:
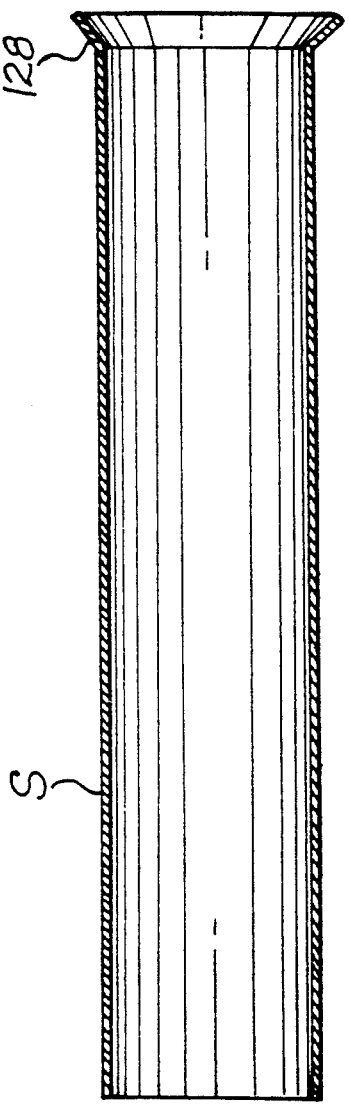
FIG. 20 is an enlarged scale longitudinal sectional view of an internally lubricated, axially split, one-piece expansion sleeve.

Referring now to FIG. 19, in the illustrated embodiment the front portion 22 of the tool housing 20 is a single member including a rear end mounting flange 50. Flange 50 is a radial flange and it includes a circular array of machine bolt receiving openings 52. Housing member 22 is a tubular member which varies in diameter along its length, inside as well as outside. Immediately forwardly of flange 50, housing member 22 extends as a constant diameter (outside) section 54. It then steps down to a relatively short smaller diameter (outside) section 56. Then, it steps down to the nose portion 26. Nose portion 26 is a smaller diameter (outside) section of substantial length. Internally, housing member 22 includes a first small diameter 58 within nose portion 26. Within section 56 it includes a slightly larger second diameter 60. Within the front part of section 54 it includes a yet larger third diameter 62. Near the longitudinal center of section 54 there is a larger fourth diameter 64. Immediately rearwardly of diameter 64 there is a larger fifth diameter 66. Rearwardly of diameter 66 there is a still larger sixth diameter 68. In the region of diameter 66 the inner sidewall of member 22 is threaded at 70. These threads mate with external threads 72 on a removable separator wall 74 (FIG. 3). As will hereinafter be described in greater detail, a shoulder 79 (FIG. 19) is formed where diameter 64 meets diameter 62. This shoulder 79 defines the forward boundary of an annular cavity in which the base 80 of sleeve stop 30 is received. Yet another shoulder 82 is formed where diameter 62 meets diameter 60. As will also be hereinafter described in more detail, shoulder 82 defines the forward end wall of a piston chamber or cylinder. The forward end of nose portion 26 includes a forwardly diverging internal surface 84. This surface 84 is a cam surface. Its function will be hereinafter described in some detail.

Separator wall 74 is inserted into housing part 22 through a rear opening 76. It is moved forwardly and rotated to s crew the threads 72 into the threads 70. Rotation continues until member 74 contacts base 80 of sleeve stop 30.

Referring to FIGS. 21-24, the sleeve holder 28 is shown to be tubular and to vary in diameter both inside and outside. Its largest outside diameter is at the rear of the tool holder 28 where it includes a piston 86. Piston 86 includes a rear radial wall or surface 88 and a front radial wall or surface 90. It also includes a peripheral groove 93 in Which a seal ring (not shown) is received. The outside diameter of piston 86 substantially equals diameter 62. Forwardly of piston 86, sleeve holder 28 includes a section 92 which is substantially equal to diameter 60. Piston 86 and most of section 92 are circumferentially continuous. At the forward portion of section 92, and throughout an elongated section 94 which extends forwardly from section 92, the sleeve holder 28 is divided by a plurality of longitudinal slots into a plurality of longitudinal fingers. In the illustrated embodiment, there are two slots 96, 98 and two fingers 100, 102. The fingers 100, 102 are on a diametrically opposite sides of section 94. The slots 96, 98 are also on diametrically opposite sides of the section 94. The fingers 100, 102 are in the nature of leaf springs. The slots 96, 98 divide the section 94 into two parts, to form such fingers 100, 102. In the preferred embodiment, the slots 96, 98 perform an additional function. They provide cam surfaces which engage the cam members C (FIGS. 10-15). As best shown by FIG. 21, slots 96, 98 include forward portions 104 (also termed "cam cavities") Which are Wider than the diameters of the cams C. The slots 96, 98 include an elongated main portion, also designated 96, 98. The width of the main portions 96, 98 is smaller than the diameter of the cams C. Cam surfaces 106, 108 extend between the cam cavities 104 and the main portions 96, 98 of the slots 96, 98.

The forward end portions of the fingers 100, 102 define sleeve engaging jaws 110, 112. Jaws 110, 112 radially outwardly bound a central sleeve receiving end opening 114. Jaws 110, 112 include end surfaces 116, 118 which in use of the puller tool are in abutting engagement with a workpiece 14 immediately surrounding a hole in the workpiece 14. Jaws 110, 112 also include cam surfaces 120, 122 positioned to contact and be contacted by the cam surface 84 of nose portion 26. Jaws 116, 118 also include inside surfaces 124, 126 which contact outer surface portions of a flare 28 on a sleeve S.

Referring to FIGS. 25 and 26, the sleeve stop 30 includes a circular base 80 at its rear end and a cylindrical tubular body extending forwardly from the base 80. The body is also designated 30 and it has a substantially constant outside diameter and a substantially constant inside diameter. As shown by FIG. 26, the forward end of sleeve stop 30 includes a first portion which lies in an axial plane and a surrounding second portion 130 which is in the nature of a bevel. In preferred form, the bevel is a frustum of a 45° cone. Surface 130 confronts surfaces 124, 126 of sleeve holder 28 and either contacts or nearly contacts such surfaces when the sleeve holder 28 is retracted.

Referring to FIG. 5, the sleeve holder 28 is inserted into housing member 22 through end opening 76. Next, the sleeve stop 30 is inserted through opening 76 and into and through the sleeve holder 28. Sleeve stop 30 is moved forwardly until its base 80 is against shoulder 79. Base 80 includes a peripheral groove 81 (FIG. 25) and a seal ring is positioned within said groove before sleeve stop 30 is inserted into the housing part 22. Next, barrier wall 74 is inserted through opening 76 and is moved to the threads 70. Barrier wall 74 is rotated to cause its thread 72 to screw into the threads 70. Barrier wall 74 is rotated until it is against base 80. As will hereinafter be described, the mandrel 32 is inserted through opening 76, through the central opening in wall 74, and through the interior of sleeve stop 30. This assembles together the components which are housed within housing part 22. More of the assembly will be described following a description of the rear portion of the puller tool 10.

Referring again to FIG. 5, when the components are assembled as shown, the piston 86 divides the cylinder or piston chamber into two working chambers. A first working chamber 132 (FIG. 4) is located forwardly of piston 86. A second working chamber 134 (FIG. 5) is located rearwardly of piston 86. In operation, fluid pressure is introduced into the rear working chamber 134 while the front working chamber 132 is vented, to cause a forward extension of the sleeve holder 28. Fluid pressure is introduced into the forward working chamber 132 while the rearward working chamber 134 is vented, to cause a rearward movement of the piston 86 and a rearward retraction of the sleeve holder 28.

Figure 10:
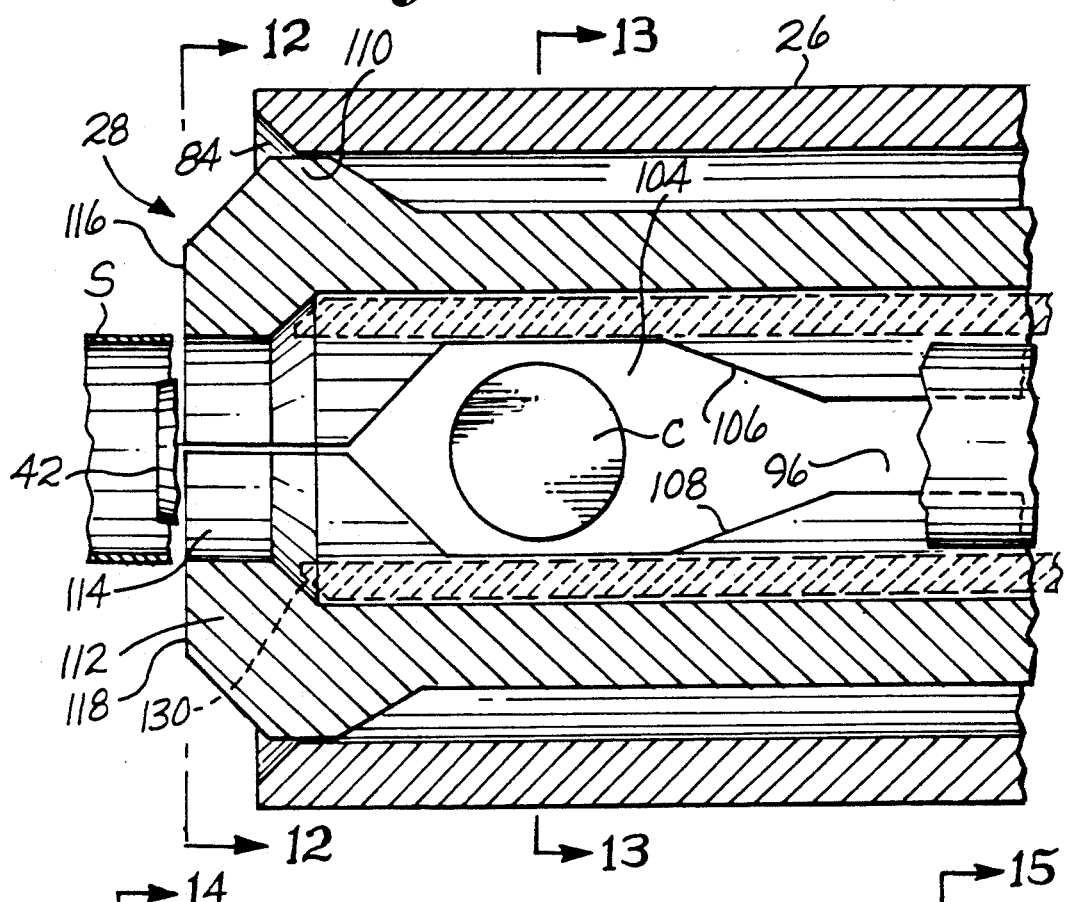
FIG. 10 is a view like FIG. 9, but with portions of the sleeve and mandrel omitted and the sleeve stop shown in phantom line, to better illustrate jaws of the sleeve holder and a cam which functions to cam the jaws apart when the sleeve holder is extended.
Figure 11:
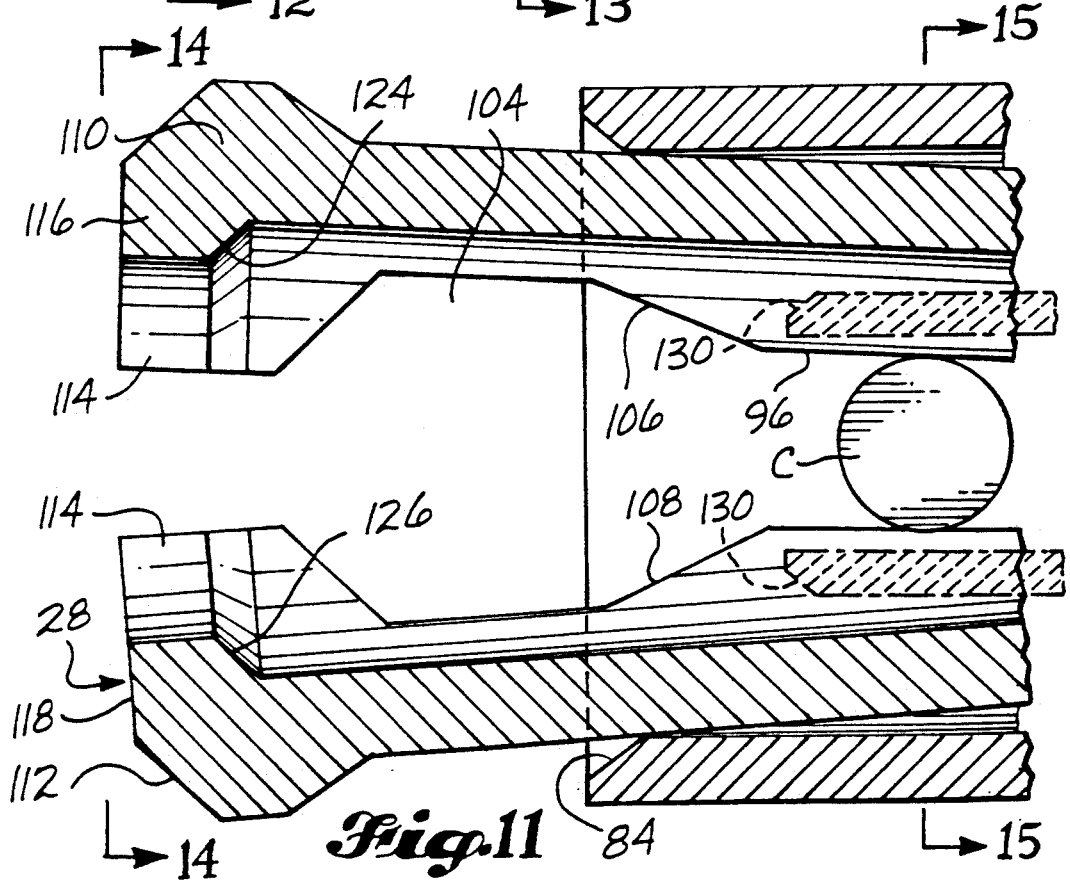
FIG. 11 is a view like FIG. 10, also showing the sleeve stop in phantom, and showing the sleeve holder extended and the cam functioning to cam apart the jaws of the sleeve holder.
Figure 12:
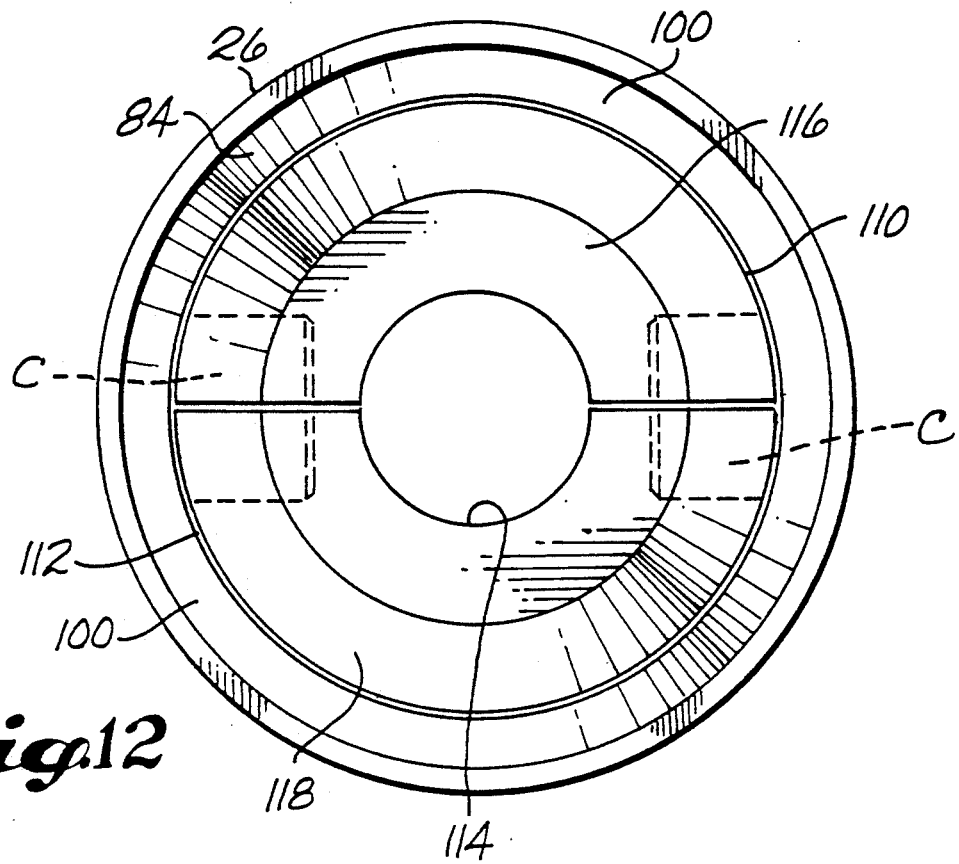
FIG. 12 is a cross-sectional view taken substantially along line 12—12 of FIG. 10.
Figure 13:
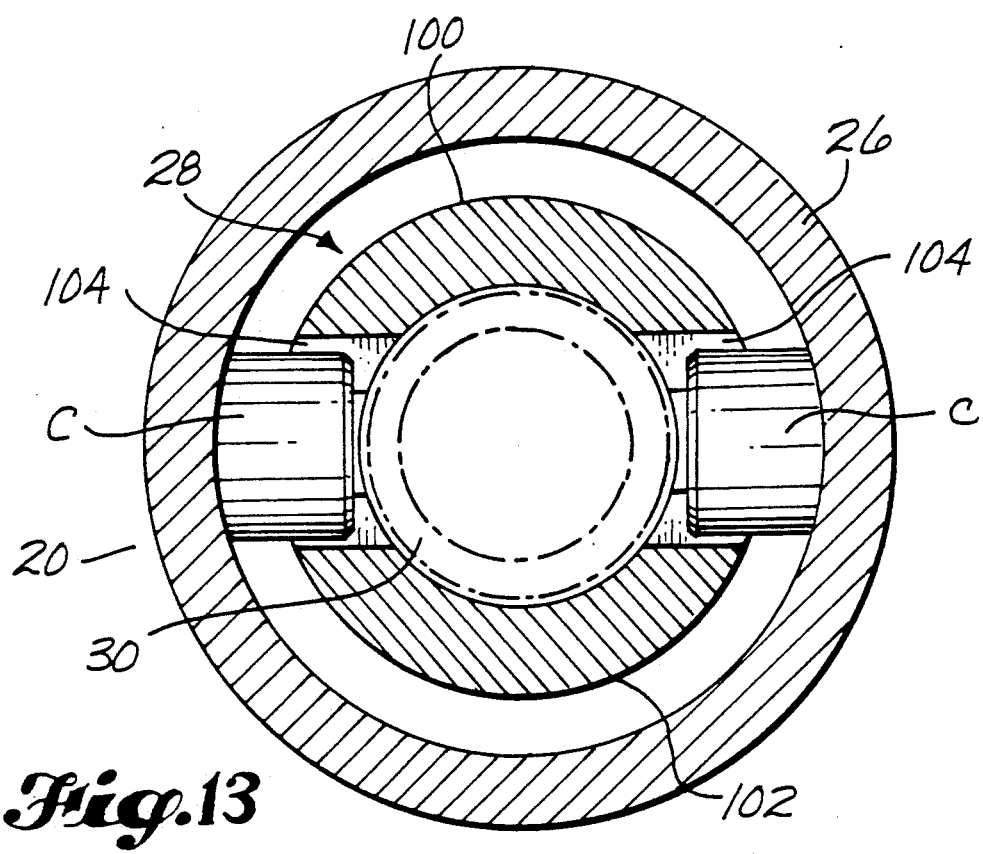
FIG. 13 is a cross-sectional view taken substantially along the line 13—13 of FIG. 10.
Figure 14:
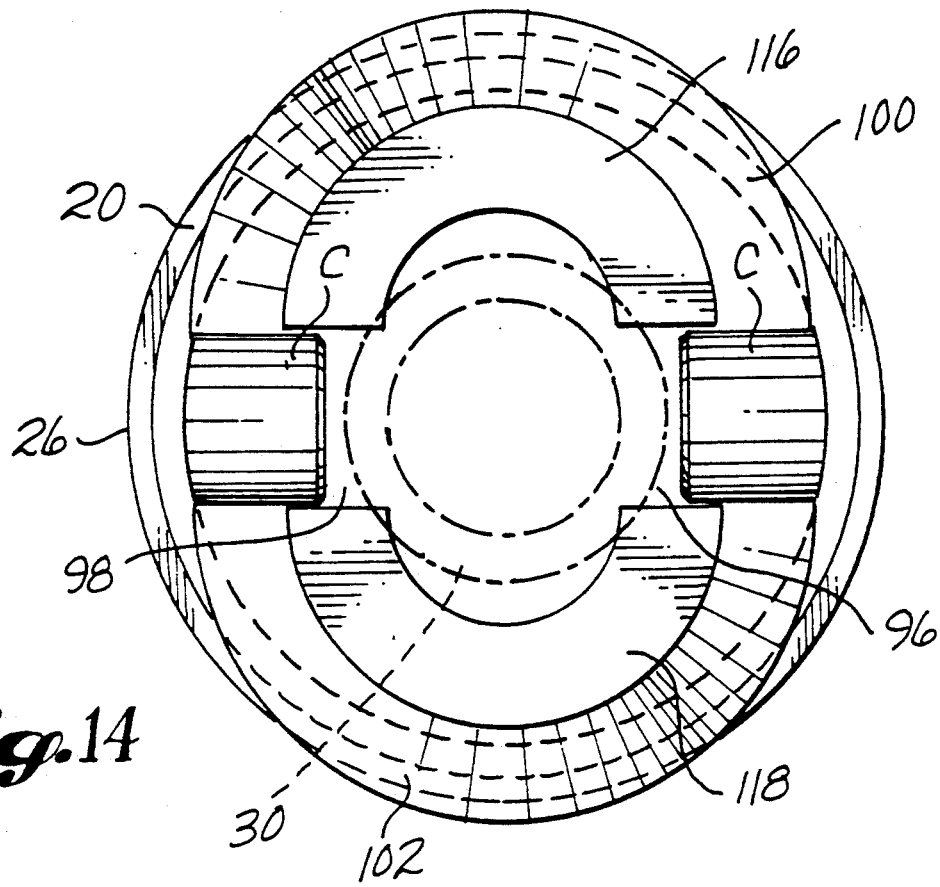
FIG. 14 is a front elevational view of the puller tool, with the mandrel and sleeve omitted, such view being taken substantially from the aspect of line 14—14 of FIG. 11.
Figure 15:
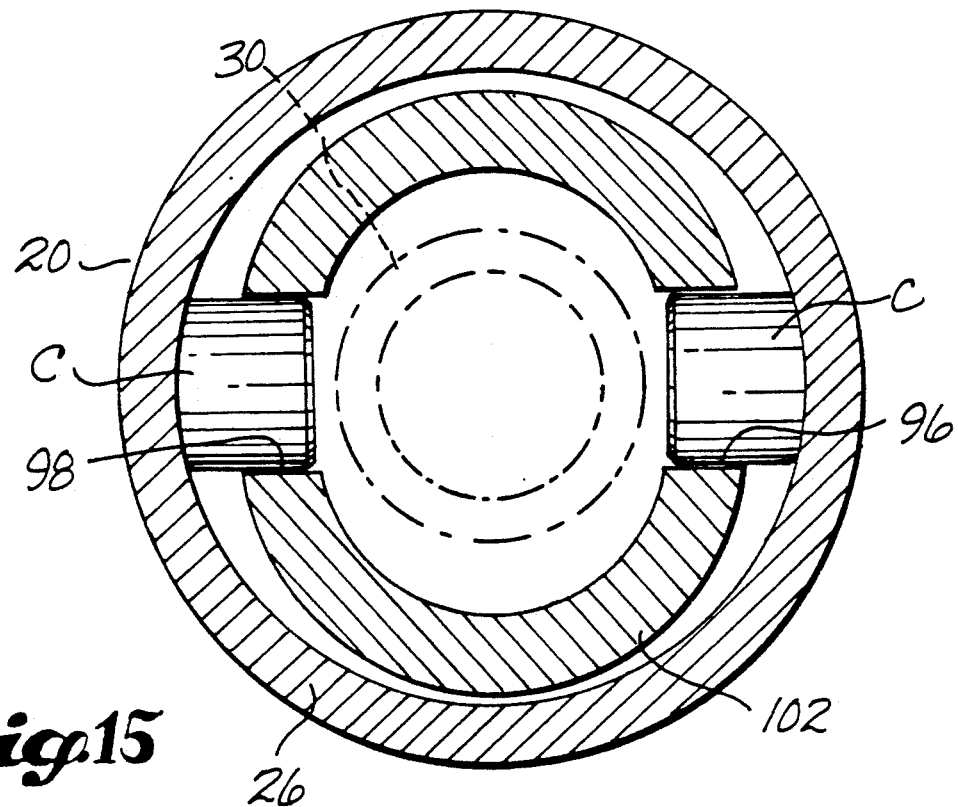
FIG. 15 is a cross-sectional view taken substantially along line 15—15 of FIG. 11.

When the sleeve holder 28 is retracted, the cams C are located within the cam cavities 104 (FIG. 10). Also, the jaws 110, 112 are located within the interior of nose portion 26 (FIG. 10). As shown in FIG. 8, when the sleeve holder 28 is retracted, the jaws 110, 112 are contracted and give the end portion of the sleeve holder 28 an outside diameter which is substantially equal to the inside diameter of nose portion 26. There is contact between the inner surface of nose portion 26 and the peripheral surfaces of the jaws 110, 112. This contact holds the jaws 110, 112 in a contracted position. As previously mentioned, fluid pressure is introduced into the rear chamber 134 of the piston-cylinder unit while the front chamber 132 is vented, to cause a forward movement of the sleeve holder 28. As sleeve holder 28 moves forwardly, the cam surfaces 106, 108 are moved towards and then into contact with the cams C. As movement continues, the cams C push against the cam surfaces 106, 108 and move the fingers 100, 102 radially apart. Before the piston 86 reaches the end of its stroke, the cams C are moved into the main portions of the slots 96, 98 (FIG. 11). In the vicinity of the cams C, the slot width is increased by the cams C so as to be equal to the diameter of the cams C. At the same time, the jaws 110, 112 are moved radially apart a considerable amount.

Referring to FIGS. 4 and 16–18, in preferred form, puller tool 10 comprises a rear portion 140 that is connected to front portion 20. Rear portion 140 includes a tool mount 142 having a forward face to which the flange 50 is bolted. A linear piston-cylinder unit 144 is defined within rear portion 140. It may include a cylinder barrel 146 which is connected to the mount 142. A cylinder head 148 is shown to be housed within mount 142. Cylinder head 148 includes an end wall 150 and an annular seal groove in which an O-ring seal 151 is located. A piston head 152 is housed within cylinder barrel 146. Piston head 152 includes an annular seal groove in which a seal ring 154 is situated. The seal ring 154 makes contact with the inner surface of the piston chamber. Piston 152 divides the piston chamber into a first working chamber 156, positioned forwardly of piston 152, and a rear working chamber 158, positioned rearwardly of piston 152. A passageway 160 leads through the mount 152 and communicates with working chamber 156. A second passageway 162 extends through a sidewall of the housing and communicates With the second working chamber 158. Piston 152 may be termed the first piston or the mandrel pulling piston.

Figure 18:
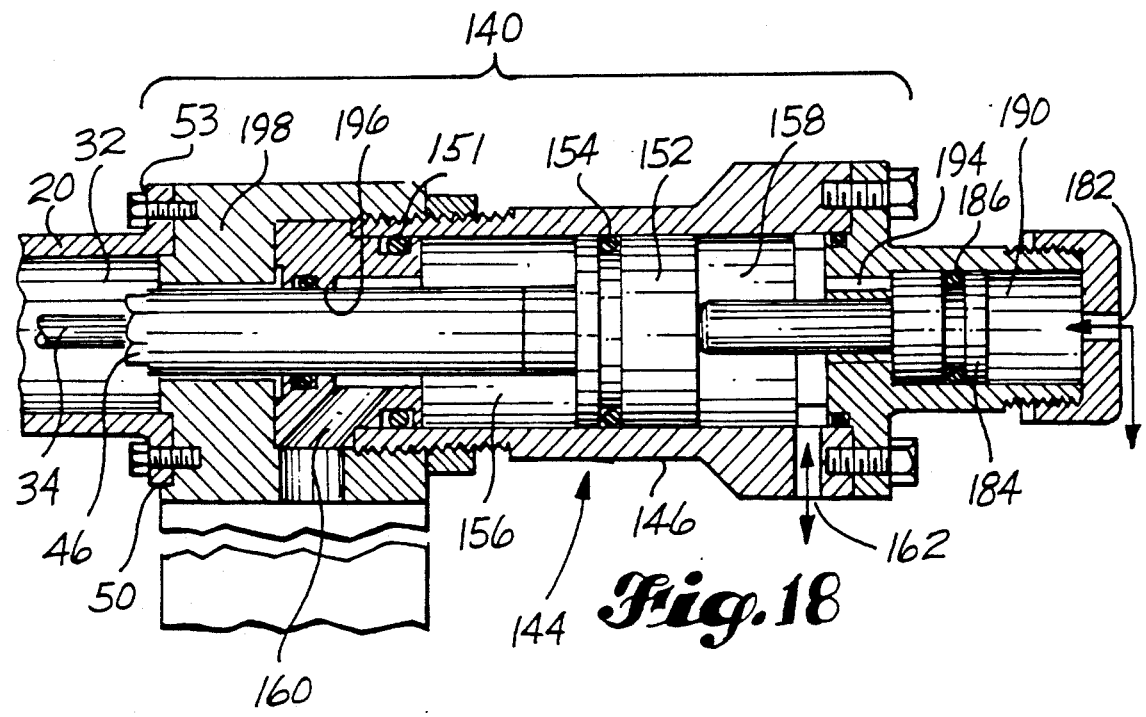
FIG. 18 is a view like FIG. 17, but showing the auxiliary piston extended to in turn extend the mandrel piston and the mandrel a predetermined distance.

In the illustrated embodiment, a second piston-cylinder unit 164 is positioned rearwardly of the first piston-cylinder unit 144. The housing includes a radial wall 166 which is a rear wall for the front piston-cylinder unit 144 and a front wall for the rear piston-cylinder unit 164. Radial wall 166 includes a central opening 168. A tubular wall 170 extends rearwardly from radial wall 168. The rear end portion of tubular wall 170 is threaded at 172. A closure cap 174 is provided for the second piston-cylinder unit. Cap 174 includes a radial end wall 176 and a forwardly extending cylindrical wall 178. Cylindrical wall 178 includes threads 180 which engage threads 172. End closure 174 is mated with threads 172 and then is rotated until the end wall 176 is substantially against the end of tubular portion 170. A fluid delivery/return opening 182 is provided in wall 176. It is through this opening that fluid pressure is selectively introduced and then vented. Piston-cylinder unit 164 includes a piston 184 having a peripheral groove in which a seal ring 186 is located. Seal ring 186 seals against leakage between the piston and the cylinder wall. Piston 184 divides the cylinder or piston chamber into a front working chamber 188 and a rear working chamber 190 (FIG. 18). A piston rod 192 extends axially forward from a central part of piston 184. Piston rod 192 extends through opening 168 in end wall 166. A passageway 194 is provided in end wall 166. Passageway 194 connects working chamber 158 with working chamber 188. The front end of piston rod 192 is not connected to piston 152. Thus, piston 152 can be extended away from piston 192. The purpose of the second piston-cylinder unit 164 will hereinafter be described as a part of the operation description.

Cylinder head 148 includes a central opening 196 and piston 152 includes a mandrel mount 198 which extends forwardly from piston 152 through the opening 196. The forward end of mandrel mount 198 includes a threaded axial opening into which the threaded rear end portion of the mandrel is received. A mandrel 32 can be connected to the mandrel mount 198 when front end portion 20 is removed. Then, front end portion 20 can be moved rearwardly over the mandrel 32 until flange 50 is against the front face of the mount 142. Then, the bolts 53 can be installed for the purpose of connecting housing part 22 to the mount 142.

Figure 27:
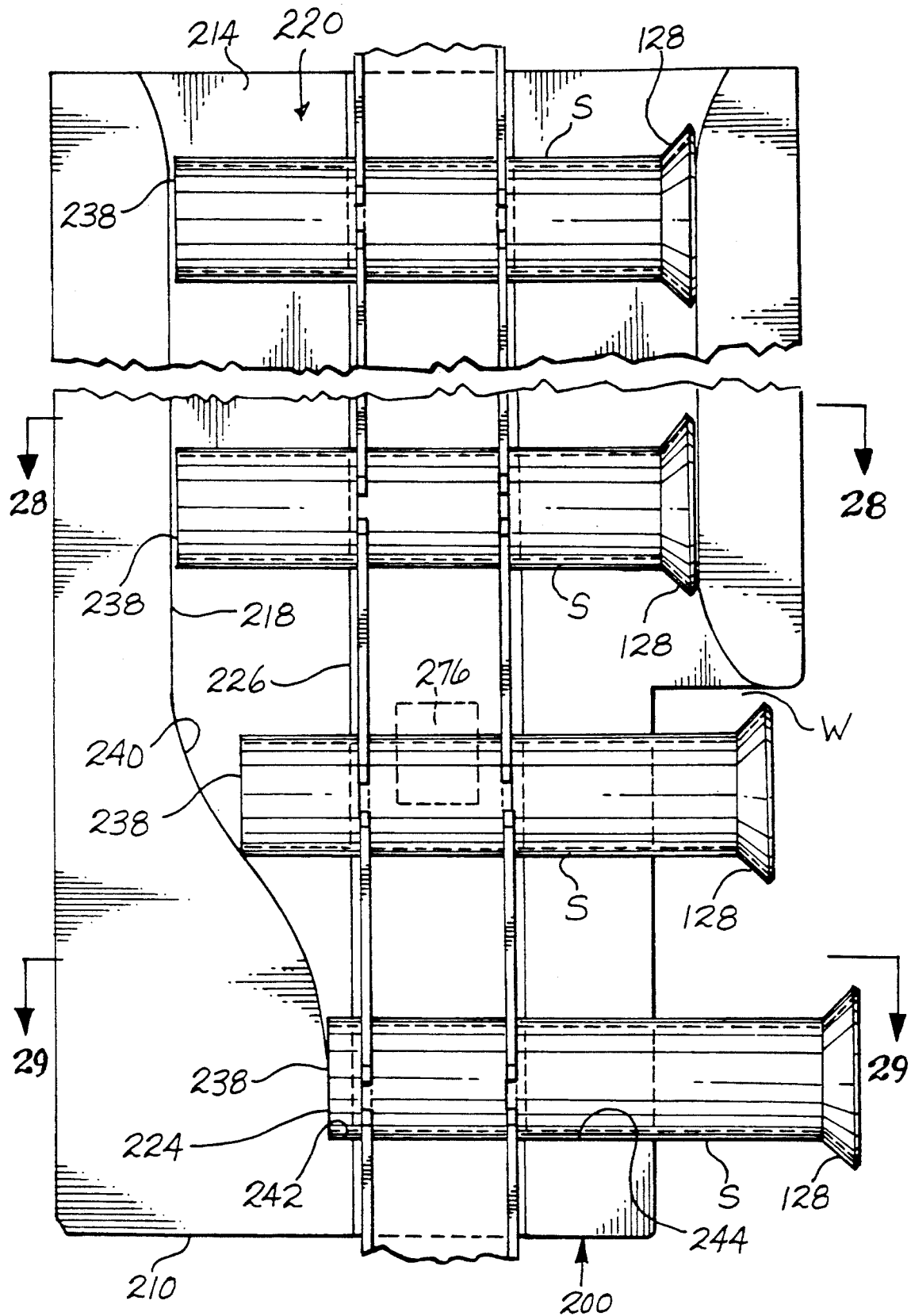
FIG. 27 is a sectional view taken substantially along line 27—27 of FIG. 28, showing in elevation a housing member which is a part of mechanism for handling and delivering sleeves to a sleeve holding station, into a position to be picked up by the puller tool, with an intermediate portion of the member being out away, to shorten the view, such view showing cold expansion sleeves being moved successively through a guide passageway to a sleeve holding station at the exit end of the passageway, and further showing a cam surface which contacts the front ends of the sleeves as they move and pushes each sleeve rearwardly to a rearward position at the holding station.
Figure 28:
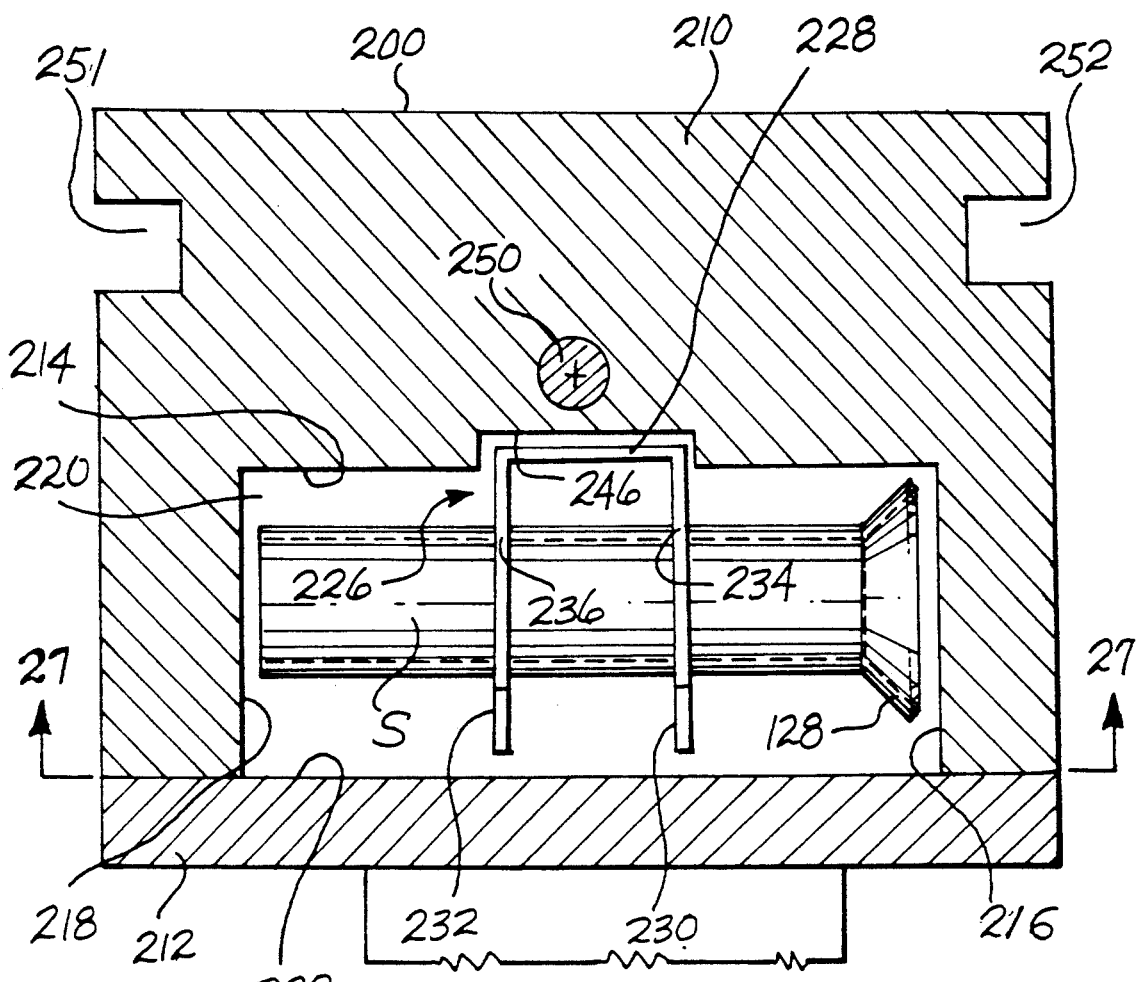
FIG. 28 is a transverse sectional view taken substantially along line 28—28 of FIG. 27.

Referring to FIGS. 27–37, a mechanism for delivering sleeves S to a holding station, in a position to be picked up by the puller tool 10, will now be described. This mechanism includes a housing 200 which may comprise a first housing member 210 and a second housing member 212. As shown in FIG. 28, housing member 210 is formed to include a channel which has a forward wall 214 and a pair of sidewalls 216, 218. Housing member 212 forms a rear wall for the channel. The channel and member 212 together define a longitudinal passageway 220 in the housing 200.

Figure 34:
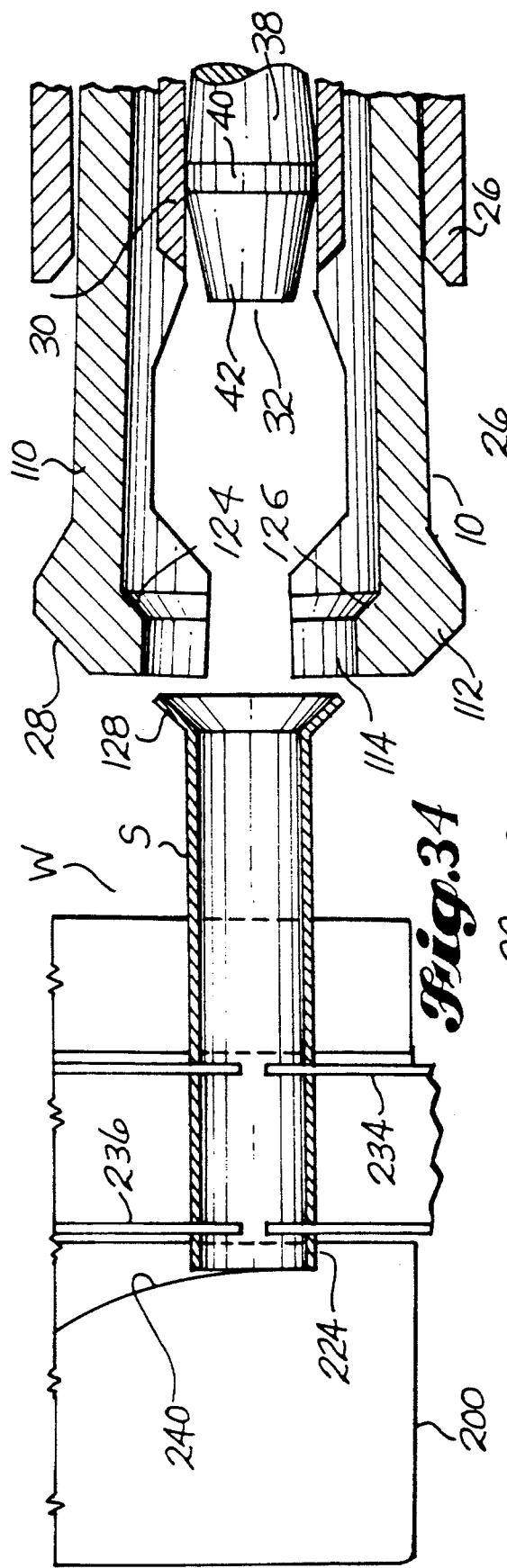
FIG. 34 is a fragmentary view at the sleeve holding station, showing a sleeve extended and in alignment with a forward portion of the puller tool, such view showing a mandrel retracted and the sleeve holder extended and radially expanded.
Figure 35:
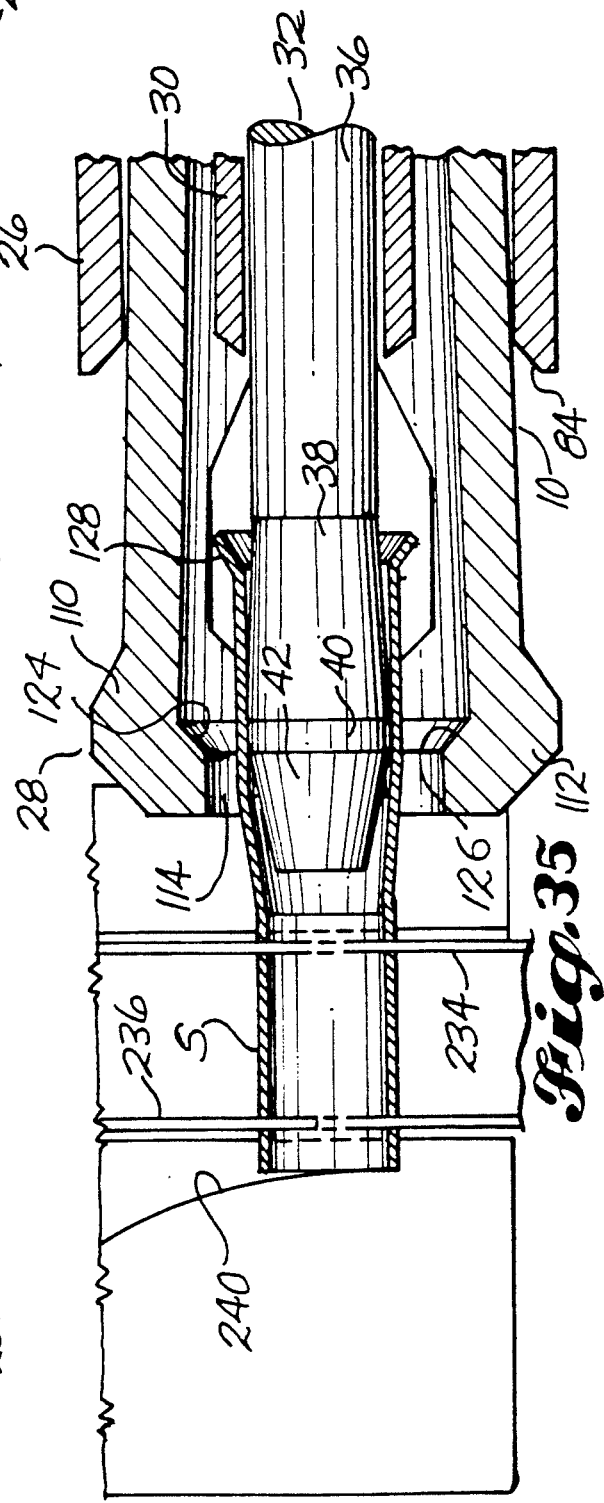
FIG. 35 is a view like FIG. 34, but showing the forward end of the puller gun advanced to place the sleeve holder around the rear end portion of the sleeve, such view showing the mandrel partially extended into the rear end portion of the sleeve.
Figure 36:
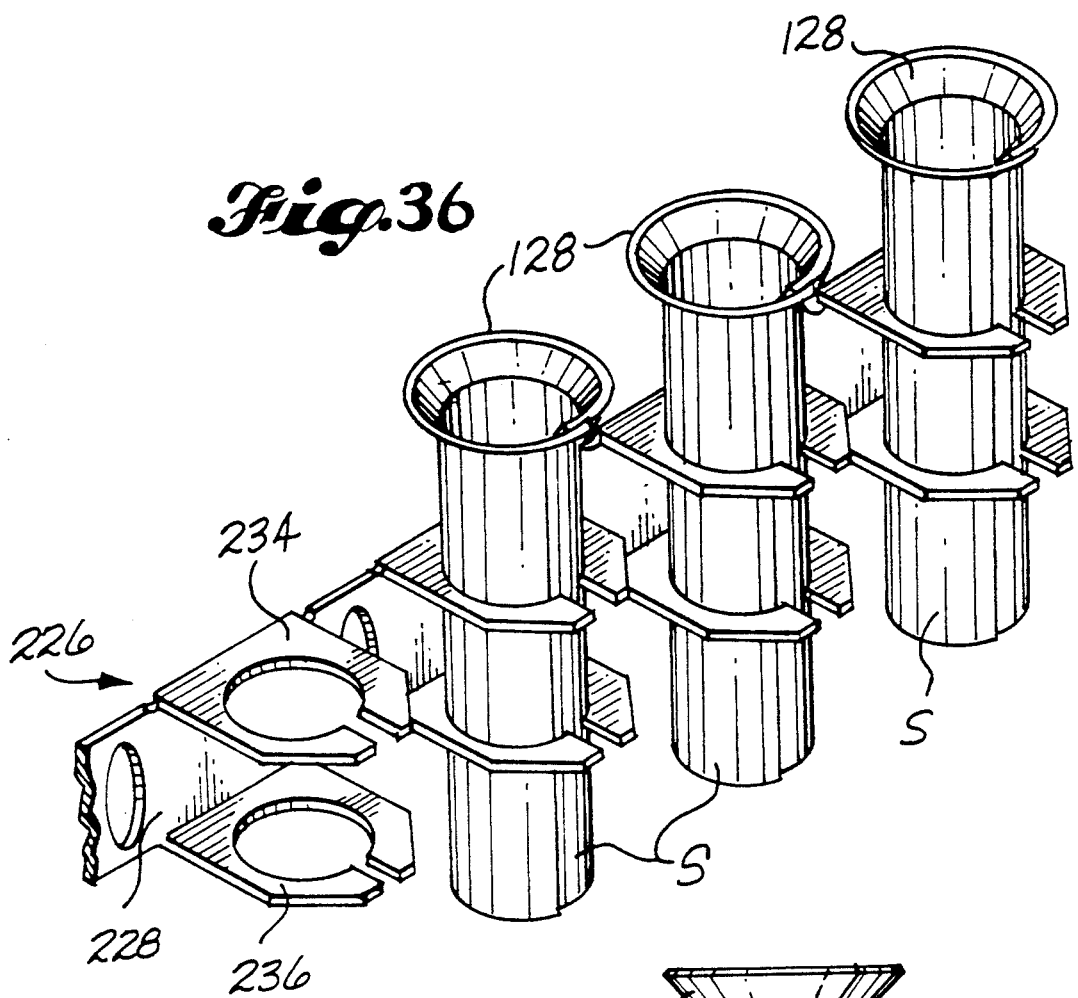
FIG. 36 is a pictorial view of a sleeve carrier, showing a pair of tabs lying flat within the plane of a web to which the tabs are connected, and showing an adjacent pair of tabs bent perpendicular to the web, but without a sleeve, and further showing additional tabs bent perpendicular to the web and holding sleeves.
Figure 37:
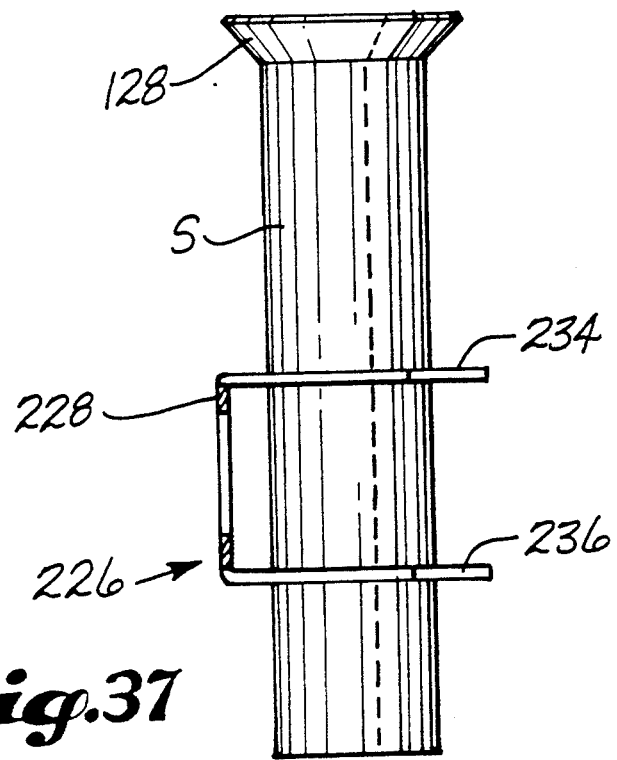
FIG. 37 is a sectional view taken through the sleeve carrier.

In the preferred embodiment, the housing 200 is elongated in the vertical direction and the passageway 220 is also elongated in the vertical direction. Passageway 220 functions to guide the sleeves S through the passageway 220 to a holding station 224 at the lower end of the housing 200. In preferred form, the sleeves S are mounted on a carrier 226. Carrier 226 may be made of plastic and includes an elongated web 228 and a plurality of pairs of tabs 230, 232. As best shown by FIGS. 28, 36 and 37, the tabs 230, 232 are connected to opposite edge portions of the web 228. The web 228 and tabs 230, 232 are constructed from sheet material which is initially flat. The tabs 230, 232 are initially in the same plane with the web 228. The sheet material is out to form the web 228, the tabs 230, 232 and openings 234, 236 in the tabs 230, 232. Preferably, the openings are slotted at their free ends. The diameter of the openings 234, 236 is slightly smaller than the outside diameter of the sleeves S. As shown by FIGS. 27–29 and 34–37, each sleeve S is inserted endwise through the openings 234, 236 in its tabs 230, 232. Insertion of a sleeve S into the openings 234, 236 of a pair of tabs 230, 232, expands the openings 234, 236 slightly and causes the tab material which borders the openings 234, 236 to frictionally grip the sleeves S.

As shown by FIG. 27, the sleeves S are spaced apart an even amount when they are mounted on the carrier 226. Initially, the sleeves S are substantially centered on the carrier 226. This is shown at the top of FIG. 27 and in FIGS. 28, 36, and 37. As previously described, a flare 128 is provided at the rear end of each sleeve S. The opposite or front end 238 is confronted by the inner surface 240 of housing wall 218. Surfaoe 240 is a cam surface. As shown by FIG. 27, as the carrier 226 and the sleeves S move longitudinally of passageway 220, there is contact between the end surfaces 238 of sleeves S and cam 240 which cams or moves the sleeves S rearwardly as they approach the holding station 224. As illustrated in FIG. 27, the cam surface 240 is curved to progressively move laterally inwardly of the passageway 220. In the illustrated embodiment, the cam surface 240 commences to curve below the second sleeve from the holding station 224. In FIG. 27, the first sleeve from the holding station 224 is shown partially moved rearwardly from a center position. The grip on the sleeves S provided by the tabs 230, 232 is a releasable grip. It allows the endwise movement of the sleeves S. As shown in FIG. 27, housing 200 includes a window W out through which the rear end portions of the sleeves S move as the sleeves S are cammed rearwardly. When a sleeve S is at the holding station 224, it is held against further downward movement by contact with cradle surfaces 242, 244. When a sleeve S is at the holding station 224, it has lower side portions which are against the cradle surfaces 242, 244 and its rear surface 238 is against the lower portion of the cam surface 240.

As best shown in FIG. 28, the passageway 220 includes a shallow channel 246 in which the carrier web 228 is received. Channel 246 serves to guide the carrier web 228 along a straight path through the passageway 220. This channel 246, and a narrow portion of the passageway 220 continue downwardly through the lower end of the housing 200, between the two portions of the cradle.

Figure 30:
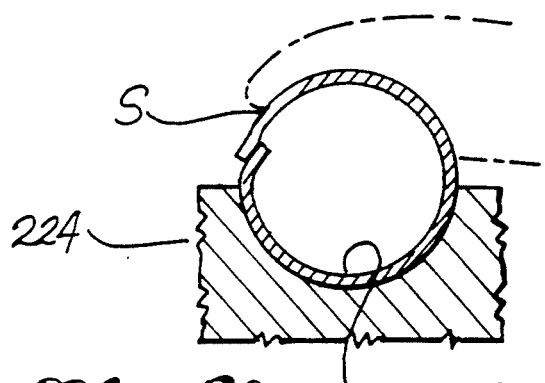
FIG. 30 is a fragmentary sectional view taken along either of the lines 30—30 in FIG. 29, such view showing a sleeve resting on a sleeve cradle at the holding station, and such view including a broken line showing of an advance finger in contact with an upper portion of the sleeve.
Figure 31:
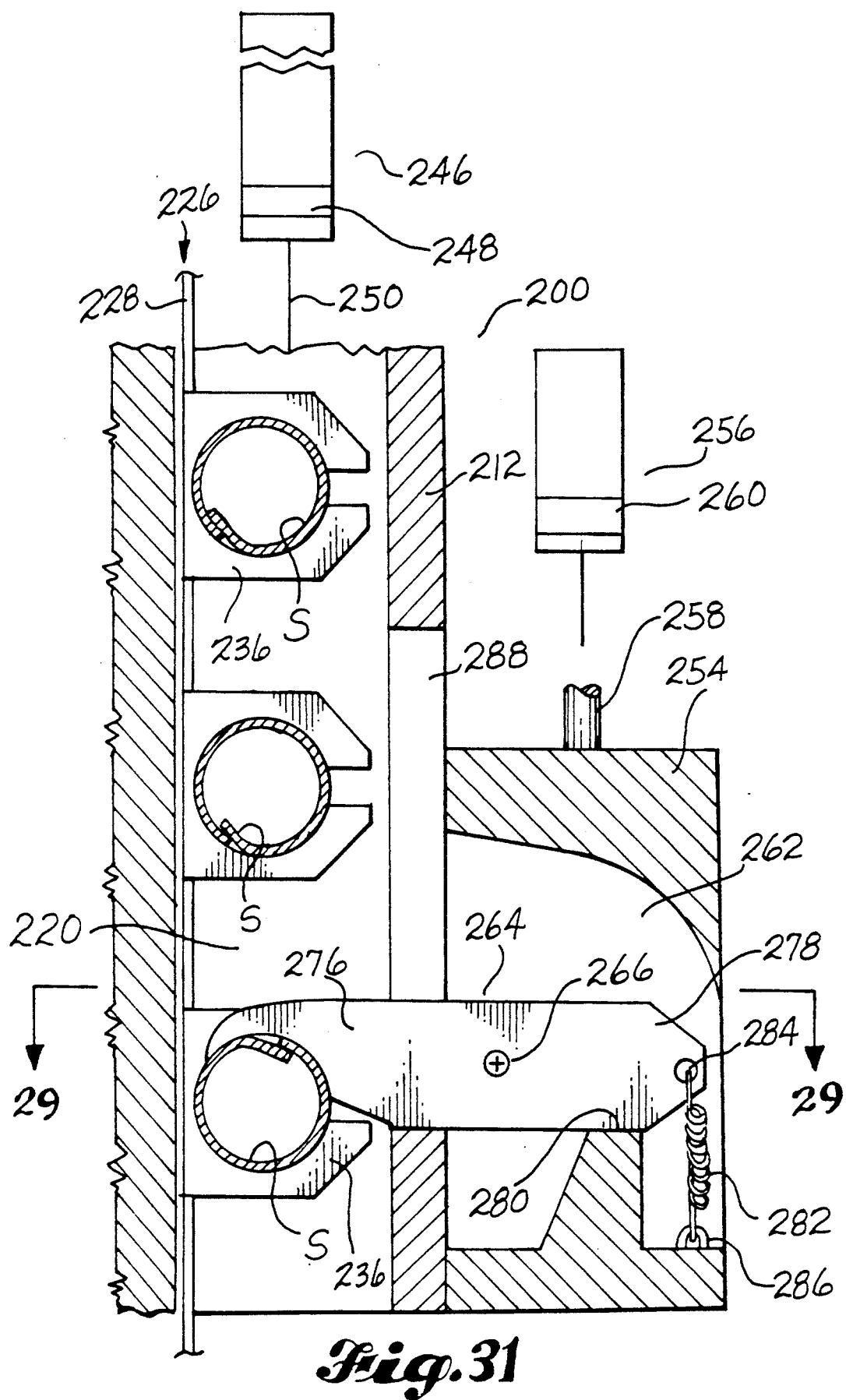
FIG. 31 is a longitudinal sectional view taken substantially along line 31—31 of FIG. 29, such view showing the advance finger against a sleeve at the holding station.

In preferred form, housing 200 is moved up and down, such as by a linear air actuator 246 (FIG. 31). A piston 248 in air actuator 246 is extended to lower the housing 200 into a position which aligns a sleeve S at the holding station 224 with the mandrel 32 and sleeve holder 28 of the puller tool 10 (FIGS. 34 and 35). The piston 248 is retracted to move the housing 200 up out of the way of the puller tool 10, to permit a forward movement of the puller tool towards an opening in a workpiece 14 (FIGS. 1 and 9). A piston rod 250 may extend from piston 248 to a connection with housing part 210 (FIGS. 30 and 31). Housing part 210 may include vertical guide grooves 251, 252 which receive suitable guide rails (not shown) which serve to mount and guide housing 200 for up and down movement between upper and lower positions.

As shown in FIG. 31, in preferred form, the sleeves S are advanced through the passageway 220 by means of an advance mechanism which is mounted on housing part 212. The advance mechanism includes a support 254 which is mounted for up and down travel along housing part 212. The up and down movement may be performed by an air actuator 256. Support 254 may be guided for up and down movement along housing member 212 by any suitable guide means. For example, piston rod 258, which extends from piston 260 to a connection with support 254, may extend through a bushing which is supported in a fixed position by a bracket which extends rearwardly from housing part 212. Or, housing part 212 and support 254 may include mating tracks and grooves serving to guide support 254 for straight line movement up and down relative to housing part 212.

Figure 29:
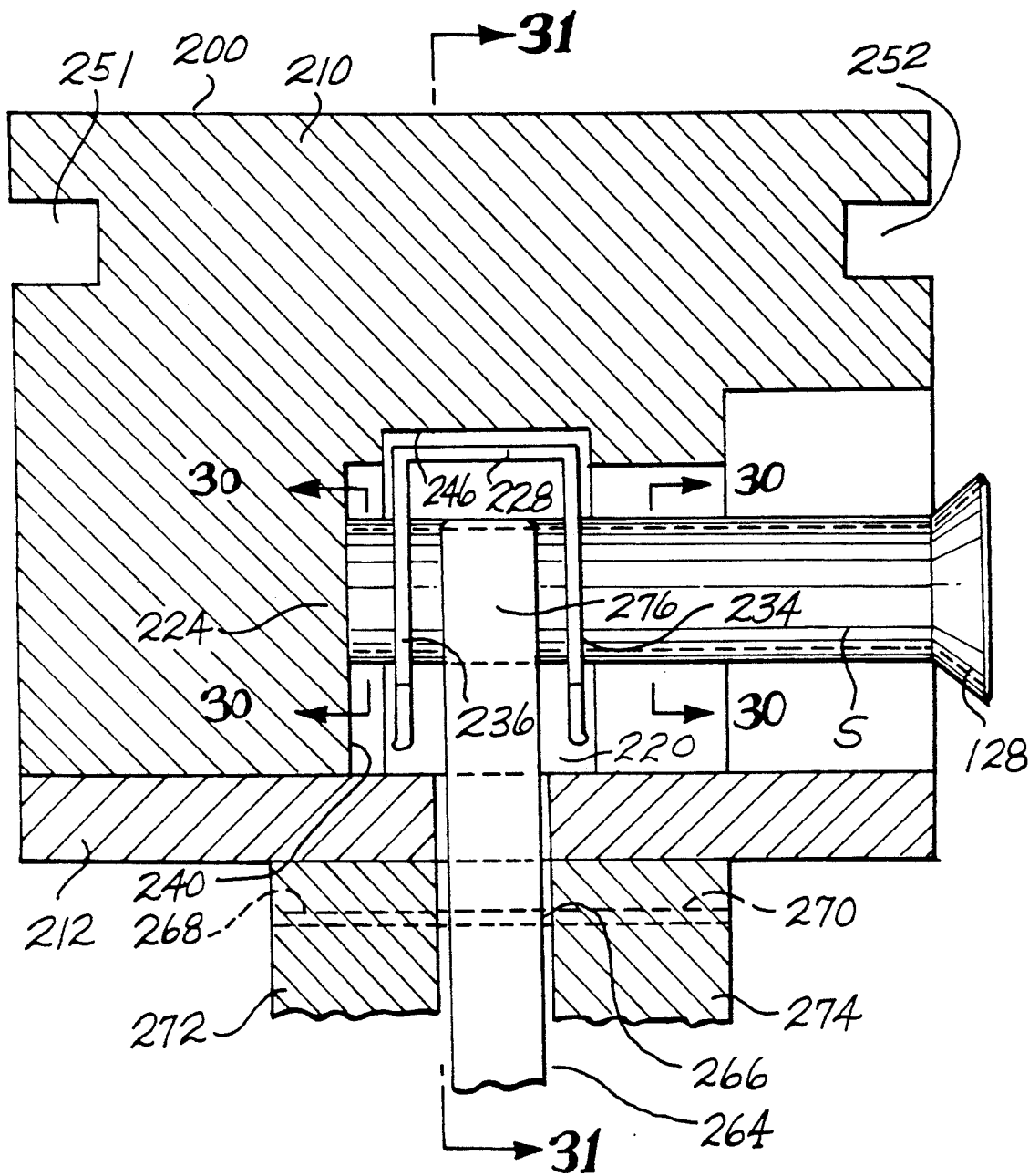
FIG. 29 is a transverse sectional view taken substantially along line 29—29 of FIG. 27.
Figure 32:
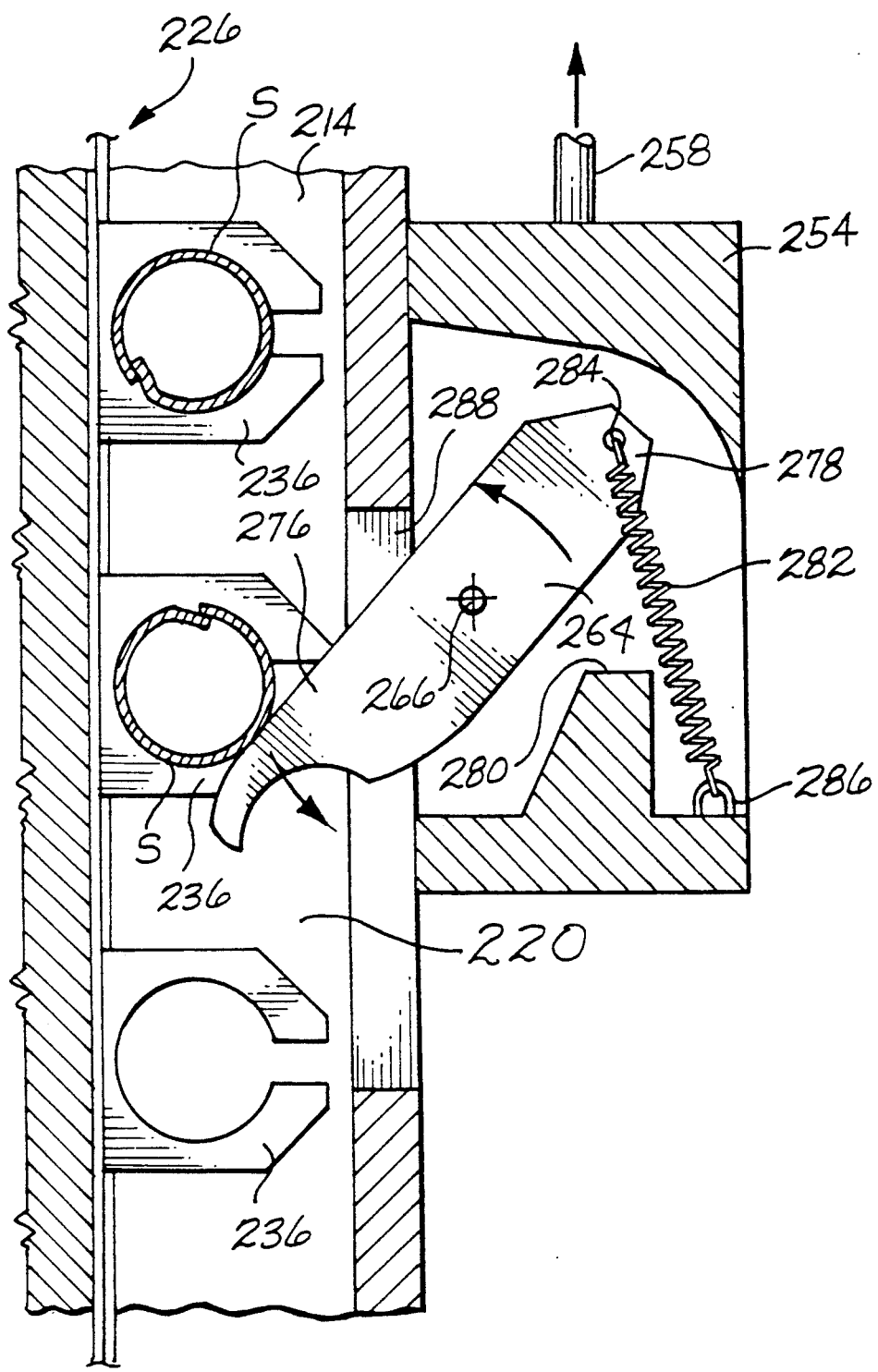
FIG. 32 is a view like FIG. 31, showing the carrier for the advance finger being retracted and showing the advance finger being rotated in position to clear a sleeve that is immediately above the holding station.
Figure 33:
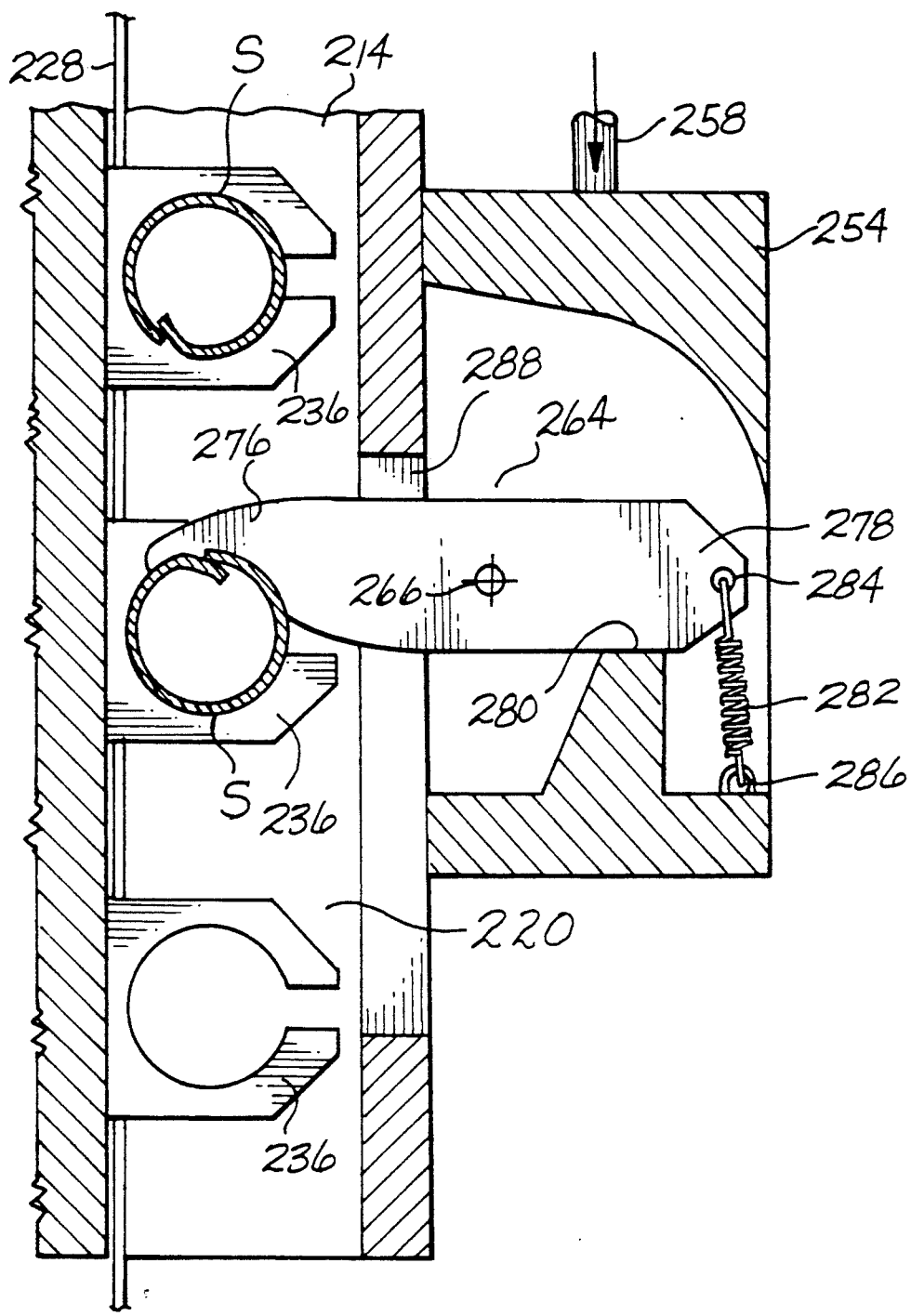
FIG. 33 is a view like FIGS. 31 and 32, showing the carrier for the advance finger retracted into a position placing the advance finger above a sleeve which is at the position immediately above the holding station, and showing the advance finger in contact with such sleeve and in a position to push the sleeve downwardly when the advance finger carrier is extended.

As shown by FIGS. 29-33, support 254 includes a cavity 262 in which an advance finger 264 is in at least in part housed. Advance finger 264 is mounted for pivotal movement about a pivot axis, such as by a pivot pin 266 which extends through an opening in a central portion of advance finger 264 and also extends through openings 268, 270 in side portions 272, 274 of the support 254 (FIG. 29). Advance finger 264 includes a first or forward end portion 276 and a second or rearward end portion 278. Support 254 includes a stop 280. A spring 282 is interconnected between rear end location 284 of advance finger 264 and a connector 286 carried by support 254. Spring 282 is a tension spring which normally pulls on the rear end portion 278 of advance finger 264, and pulls it against the stop 280. In this position, the forward end portion 276 extends into and spans across the passageway 220 (FIGS. 28 and 29). A slot-like window 288 is provided in housing member 212 and the forward end portion 276 of advance finger 264 extends through this window. FIG. 31 shows the position of advance finger 276 when the piston 260 is extended and the support 254 is in a down position. The forward portion 276 of advance finger 264 is down on a sleeve S but does not prohibit removal of the sleeve by the puller tool 10 from the holding station 224. Following removal of the sleeve S, the piston 260 is retracted. This moves support 254 upwardly. Eventually the top surface of the front portion 276 of advance finger 264 will contact the sleeve S that is in the approach position one step removed from the holding station 224. As shown by FIG. 32, this contact will not prevent further upward movement of support 254. In response to the contact, the advance finger 264 will pivot until its front portion 276 clears the sleeve S which is at the approach position. After advance finger 264 clears the sleeve S, the spring 282 will swing the advance finger 264 back into a position with its rear end portion 278 against the stop 280. The front end portion 276 will now be positioned between the sleeve S at the approach position and the sleeve S that is two steps removed from the holding station 224. When piston 260 is next extended, support 254 will be moved downwardly and the forward portion 276 of advance finger 264 will be moved against the sleeve S that is at the approach position. The contact between the rear end portion 278 of advance finger 264 and the stop 280 will prevent rotation of advance finger 264 beyond the position shown in FIG. 33. Thus, as support 254 is moved downwardly, the contact of finger portion 276 with the sleeve S will move such sleeve S down to the holding station 224.

Referring to FIG. 34, a sleeve S is shown to be positioned at the holding station 224, with its rear end portion projecting rearwardly out through the window W. Puller tool 10, with mandrel 32 retracted and sleeve holder 28 extended and radially expanded, is shown positioned in axial alignment with the sleeve S. According to a method aspect of the invention, the tool 10 is moved axially towards housing 200, so as to move the rear end portion of sleeve S through the end opening 114 and into the interior of the sleeve holder 28. Then, fluid pressure is introduced through passage 182 into the working chamber behind piston 184 while working chamber 188 is vented. This moves the main piston 152, mandrel holder 198 and mandrel 32 forwardly a distance equal to a stroke length of piston 184. As shown by FIG. 35, it moves the forward end portion of mandrel 32 partially into the sleeve S. Next, the sleeve holder 28 is retracted by fluid pressure introduction forwardly of piston 86 while the chamber rearwardly of piston 86 is vented. As sleeve holder 28 retracts, the jaws 110, 112 contract into a position placing the inner jaw surfaces 124, 126 axially forwardly of the sleeve flare 128. Then the puller tool 10 is moved back away from housing 200. This pulls the sleeve S out from the tab openings and removes it from the sleeve delivery mechanism. Next, but in no particular order, the mandrel 32 is fully extended through the sleeve S and the housing 220 is raised up out of the way, so that the tool 10 can be moved forwardly to insert the mandrel 32 and the sleeve S into an opening 12 in a workpiece 14.

Sleeve S is internally lubricated by a solid film lubricant. This type of lubricant is sprayed on in liquid form and hardens. Many solid film lubricants are commercially available and each contain in general a composition of lead oxide, graphite and molybdenum disulfide. This lubricant film is capable of withstanding better than one hundred thousand psi. The use of the solid lubricant in combination with the sleeve makes it possible to work with much greater interference or with, in other words, less difference between mandrel and hole diameter, increasing the efficient degree of cold working and also the fatigue life of the fastener joint.

Referring to FIGS. 1 and 4, the tool mount 142 is shown to be mounted for travel along a pair of guide rods 284, 286 which are at their ends secured to posts 288, 290. Posts 288, 290 project upwardly from a longitudinal base member 292. The mount 142 is moved back and forth along the guide rods 284, 286 by any suitable drive mechanism. In the illustrated embodiment, this drive mechanism is in the form of an elongated lead screw 294 which extends from a reversible electric motor 296, first through post 290, then through the space between posts 290 and 288, and then into post 288. The lead screw 294 is supported at its ends by suitable bearings, in conventional fashion. The base of mount 142 includes a nut internal member (not shown) of conventional construction through which the lead screw passes. Rotation of lead screw 294 causes the nut member, and hence mount 142 and puller tool 10, to be moved lengthwise of the lead screw 294 and the guide rods 284, 286. The motor 296 is controlled by a suitable motor control circuit which is not a part of the present invention.

Base 292 for the puller tool 10 and housing 210 for the sleeve loader 200 are mounted on robot arms, or the like. The robots or other mechanisms are moved to position the sleeve holder 200 forwardly of the puller tool, and to position the puller tool in a position to pick up a sleeve, and to move the puller tool for the purpose of picking up the sleeve, and then moving the puller tool assembly away from the sleeve loader, and the sleeve loader out from in front of the openings 12, and then moving the puller tool 10 to insert the mandrel and the sleeve carried by the mandrel into an opening 12, followed by the tool 10 being held in position and the mandrel being retracted to expand the sleeve S and cold expand the hole 12 in which the sleeve S is located. It is expected that proximity sensors will be used to provide input commands for the computer which controls the robots and the operation of the puller tool 10.

FIGS. 38 and 39 illustrate a modified construction of the puller unit 300. Puller unit 300 is mounted on a support 302 which in turn is mounted on an elongated lead screw 304 which is selectively rotated in either direction by a motor 306. The construction of the lead screw assembly 304, 306 is not a part of the invention and so the details of this mechanism will not be described. However, as explained in connection with FIGS. 1 and 4, rotation of the lead screw 304 in one direction causes the puller unit 300 to advance along the lead screw and guide structure for the puller unit 300. Rotation of the lead screw 304 in the opposite direction causes the puller unit to move rearwardly along the lead screw. Lead screw assembly 304, 306 is mounted on a base 292 which may be mounted on a robot arm or other mechanism designed to position the puller tool, in the manner described above.

Referring to FIG. 39, the puller unit 300 includes a forward housing member 308 which has a small diameter forward portion 310, a larger diameter rear portion 312, a generally conical transition portion 314 and a rear end flange 316. Flange 316 mates with the forward end of a central housing part 318. A retainer ring 320 is used to secure housing part 308 to housing part 318. The puller unit 300 includes a rear housing part 322 having a small diameter, tubular forward portion 324 and a tubular rear portion 326. An elongated tubular sleeve holder 328 is provided at the forward end of a member 330. The rear portion 332 of member 330 is connected to the forward end of a tubular member 334. Member 334 includes a radial flange 336 at its rear end. Flange 336 includes a circumferential groove in which is situated an annular seal ring 338. Flange 336 serves as a piston and divides an annular chamber space formed radially between members 318 and 334, into two working chambers 340, 342.

Figure 16:
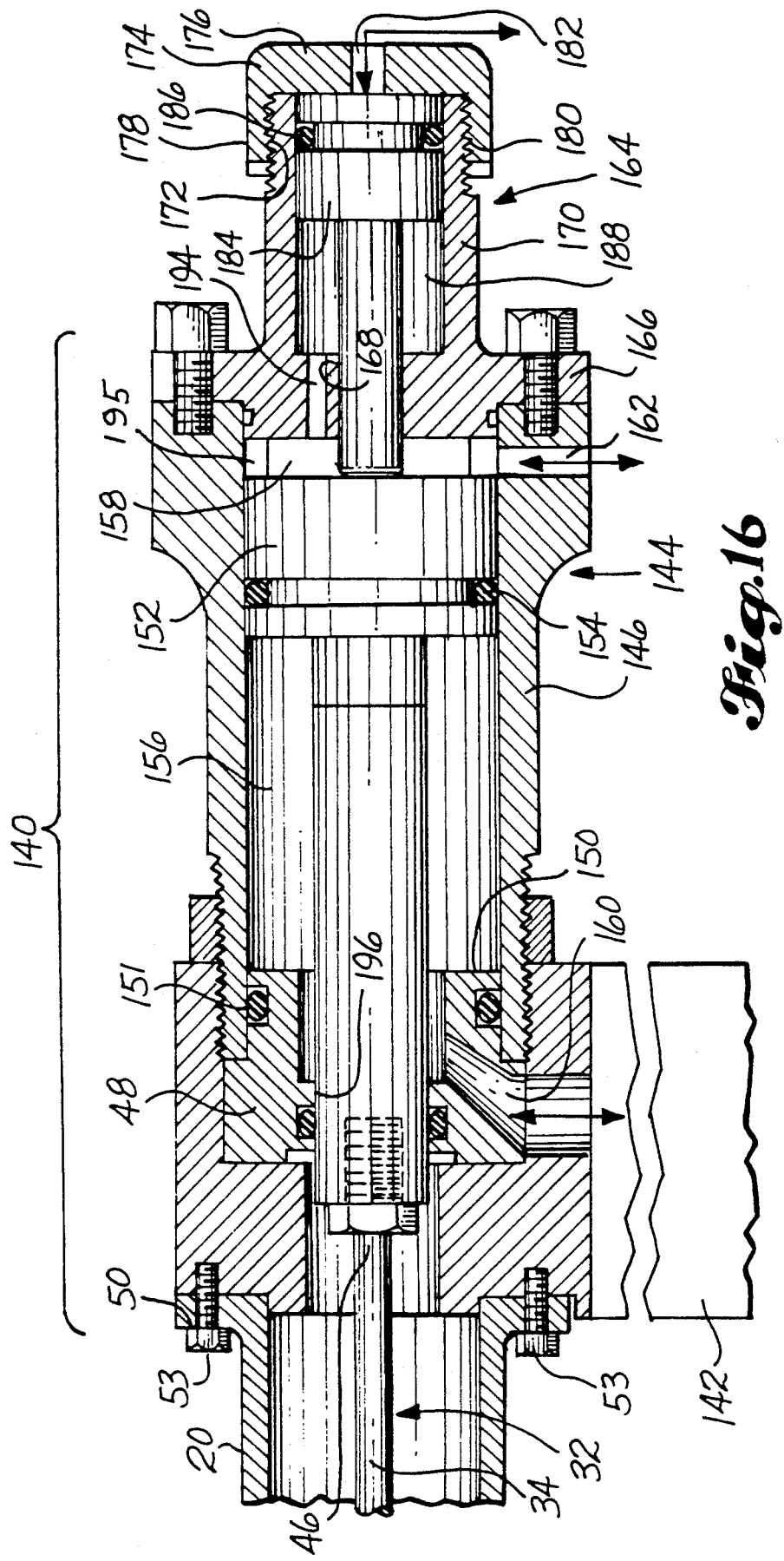
FIG. 16 is an enlarged scale fragmentary longitudinal sectional view of the rear portion of the puller tool, such view showing the mandrel piston retracted and also showing an auxiliary piston retracted.
Figure 17:
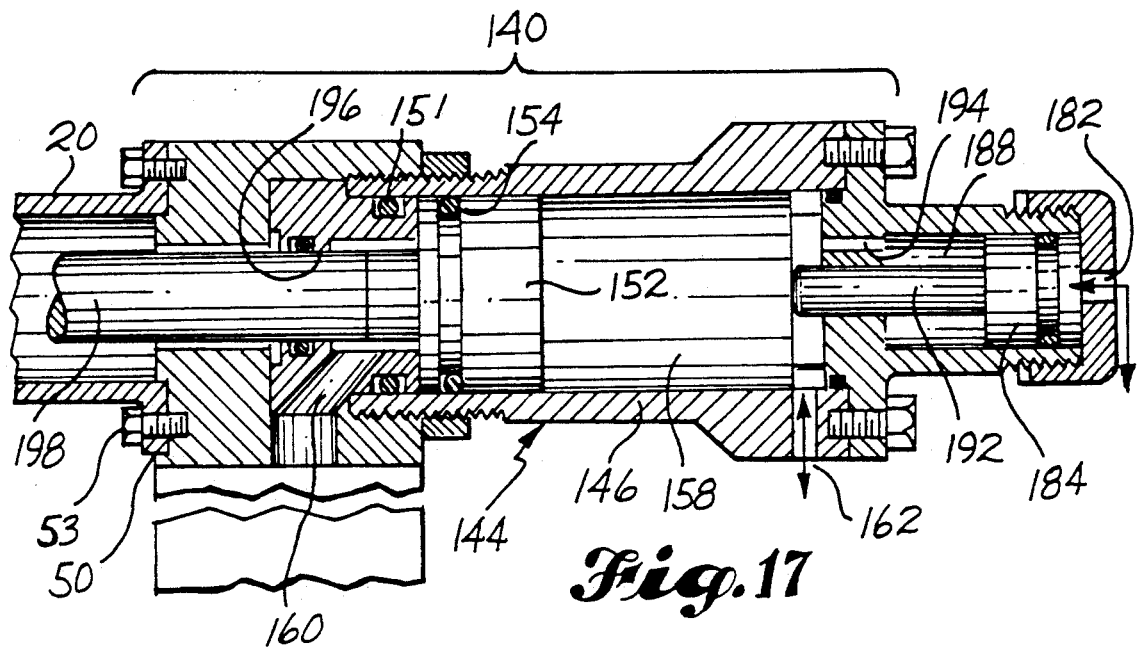
FIG. 17 is a reduced scale view like FIG. 16, but showing the mandrel piston extended and the auxiliary piston retracted.

An elongated sleeve stop 344 extends axially through the sleeve holder 328. The rear end portion 346 of the sleeve stop 344 is connected to the forward end of housing member 324. The sleeve holder 328 and the sleeve stop 344 may be substantially as described above in connection with FIGS. 1–15. A mandrel (not shown) is at its rear end attached to the forward end of a mandrel support 348. The forward end of mandrel support 348 may include an axial threaded bore, such as shown in FIG. 16, into which the threaded rear end portion of a mandrel is received. Mandrel support 348 is also a piston rod. A piston head 350 is connected to the rear end of member 348. Piston head 350 carries a seal 352 which seals between it and the cylindrical sidewall 354 of a piston chamber 356 formed within housing part 328. Chamber 356 includes a rear closure 358 in the nature of a cap which is threaded onto the rear end portion of housing part 326. An O-ring seal 360 is provided between the forward end of cap 358 and a shoulder formed in housing part 326, as shown in FIG. 39.

The puller tool 300 shown is an all hydraulic system. An inlet-outlet fitting 362 provides a passageway into and out from working chamber 340. A similar inlet-outlet fitting 364 provides a passageway into and out from working chamber 342. A working chamber 366 is formed forwardly of piston head 350. A working chamber 368 is formed rearwardly of piston head 350. A inlet-outlet fitting 370 forms a passageway into and out from working chamber 366. An inlet-outlet fitting 372 forms a passageway into and out from working chamber 368.

In use, hydraulic pressure is communicated to working chamber 342 via fitting 364 while working chamber 340 is connected to tank via fitting 362. This causes a forward movement or advance of part 330 and sleeve holder 328. Connection of working chamber 340 to pressure and working chamber 342 to return causes a retraction of member 330 and sleeve holder 328. Introduction of pressure into working chamber 366 via fitting 370 while working chamber 368 is connected to return via fitting 373, causes a retraction of the mandrel holder 348. Introduction of pressure into working chamber 368 via fitting 372 while working chamber 366 is connected to return via fitting 370 causes a forward movement or extension of the mandrel holder 348. The sequence of operation is as described above in connection with the first embodiment. A series of limit switches may be used in a control circuit to automatically control operation of the puller unit. Such a control system is not a part of this invention but one is in the beginning stages of development.

The system and method of the invention can be used for expanding split sleeves, for bushing installation, in addition to expanding split sleeves for fatigue enhancement of the material which immediately surrounds a hole, such as a fastener hole. A one piece tubular bushing is installed into the hole. The split sleeve on a mandrel is then installed through the bushing. A retraction of the mandrel through the split sleeve causes a radial expansion of the split sleeve which in turn causes a radial expansion of the bushing. This radial expansion of the bushing creates a tight interference fit between the bushing and the hole in which the bushing is situated.

The scope of protection is to be determined not by the illustrated embodiment which has been illustrated and described, but rather by the patent claims which follow, interpreted in accordance with the established rules of patent claim interpretation, including use of the doctrine of equivalents.

What is claimed is:

1. Apparatus for prestressing a hole in a workpiece, comprising:
    a puller tool including an elongated tubular nose portion having a front end;
    an elongated tubular sleeve holder within said nose portion;
    an elongated tubular sleeve stop within said sleeve holder, said sleeve stop having a front end;
    an elongated mandrel extending through said sleeve stop and including in order a rear end portion, a small diameter portion, an increasing diameter portion, and a maximum diameter portion;
    said sleeve holder having a circumferentially continuous rear end portion and an elongated axially slotted front portion extending axially forwardly from said rear end portion, said front portion including a plurality of axial fingers separated by slots, said fingers having front end portions which define a front end opening and sleeve gripping jaws radially outwardly bounding said end opening, said jaws being positioned axially forwardly of the front end of the sleeve stop;
    said sleeve holder being movable axially between a retracted position, wherein said jaws are located at least partially within the nose portion and are radially contracted and an extended position wherein said jaws are positioned axially forwardly of the nose portion and are radially expanded;
    a piston within the puller tool connected to the portion of said mandrel, said piston being extendable and retractable for extending and retracting the mandrel;
    said mandrel having an extended position in which a part of the small diameter portion of the mandrel and the increasing diameter and maximum diameter portions of the mandrel are positioned endwise forwardly of the tubular nose portion;
    a split sleeve which when the mandrel is in its extended position is positionable on the small diameter portion of the mandrel outwardly of the outer end of the sleeve stop, said split sleeve having a rear end; and
    said piston being retractable to pull the mandrel through the sleeve while the sleeve holder is retracted, and the jaws of the sleeve holder are against the workpiece, and the rear end of the sleeve is against the front end of the sleeve stop, and the sleeve is within a hole in the workpiece.

2. Apparatus according to claim 1, wherein the rear portion of the sleeve holder includes a piston, wherein the puller tool includes a cylinder in which the piston is located, wherein a first working chamber is formed axially forwardly of the piston and a second working chamber is formed axially rearwardly of the piston, wherein fluid pressure introduction into the first working chamber while the second working chamber is at a low pressure moves the piston to retract the sleeve holder, and pressure introduction into the second chamber while the first chamber is at low pressure moves the piston to extend the sleeve holder.

3. Apparatus according to claim 2, wherein the fingers of the sleeve holder diverge apart when the sleeve holder is in its extended position.

4. Apparatus according to claim 3, wherein the nose portion includes at least one radially inwardly projecting cam positioned in a slot between adjacent axial fingers, and wherein said axial fingers include cam surfaces which contact said cam when the sleeve holder is extended, and wherein said contact cams the fingers apart.

5. Apparatus according to claim 3, wherein the sleeve holder includes two diametrically opposed fingers separated by two diametrically opposed slots.

6. Apparatus according to claim 3, wherein the jaws have inner surfaces positioned radially outwardly of the end opening and axially forwardly of the front end of the sleeve stop, and wherein said split sleeve has a flared rear end which is positionable axially between said inner surfaces of the jaws and the front end of the sleeve stop.

7. Apparatus according to claim 2, wherein the nose portion includes at least one radially inwardly projecting cam positioned in a slot between adjacent axial fingers, and wherein said axial fingers include cam surfaces which contact said cam when the sleeve holder is extended, and wherein said contact cams the fingers apart.

8. Apparatus according to claim 7, wherein the sleeve holder includes two diametrically opposed fingers separated by two diametrically opposed slots.

9. Apparatus according to claim 7, wherein the jaws have inner surfaces positioned radially outwardly of the end opening and axially forwardly of the front end of the sleeve stop, and wherein said split sleeve has a flared rear end which is positionable axially between said inner surfaces of the jaws and the front end of the sleeve stop.

10. Apparatus according to claim 2, wherein the sleeve holder includes two diametrically opposed fingers separated by two diametrically opposed slots.

11. Apparatus according to claim 10, wherein the jaws have inner surfaces positioned radially outwardly of the end opening and axially forwardly of the front end of the sleeve stop, and wherein said split sleeve has a flared rear end which is positionable axially between said inner surfaces of the jaws and the front end of the sleeve stop.

12. Apparatus according to claim 2, wherein the jaws have inner surfaces positioned radially outwardly of the end opening and axially forwardly of the front end of the sleeve stop, and wherein said split sleeve has a flared rear end positionable axially between said inner surfaces of the jaws and the front end of the sleeve stop.

13. Apparatus according to claim 1, wherein the fingers of the sleeve holder diverge apart when the sleeve holder is in its extended position.

14. Apparatus according to claim 1, wherein the nose portion includes at least one radially inwardly projecting cam positioned in a slot between adjacent axial fingers, and wherein said axial fingers include cam surfaces which contact said cam when the sleeve holder is extended, and wherein said contact cams the fingers apart.

15. Apparatus according to claim 1, wherein the sleeve holder includes two diametrically opposed fingers separated by two diametrically opposed slots.

16. Apparatus according to claim 1, wherein the jaws have inner surfaces positioned radially outwardly of the end opening and axially forwardly of the front end of the sleeve stop, and wherein said split sleeve has a flared rear end which is positionable axially between said inner surfaces of the jaws and the front end of the sleeve stop.

17. In a puller tool of a type which is used for pulling a mandrel axially through a one-piece prestressing sleeve located within a fastener hole in a workpiece, said mandrel having an small diameter rear portion and forwardly thereof having an increasing diameter portion and an adjacent maximum diameter portion, so that the increasing diameter portion and the adjacent maximum diameter portion of the mandrel can exert expansion forces on the sleeve, to cause the sleeve to be expanded in the radial direction and prestress the workpiece around the hole, and in that manner improve fatigue properties of the workpiece, the improvement comprising:

a tubular sleeve stop surrounding the mandrel and through which the mandrel is pulled, said sleeve stop having a forward end which makes abutting contact with an end of a sleeve;

a tubular sleeve holder surrounding said sleeve stop, said sleeve holder including axial fingers separated by axial slots, with forward end portions of the fingers defining a sleeve and mandrel receiving end opening and sleeve engaging jaws radially outwardly bounding said opening;

a tubular nose portion surrounding said sleeve holder;

wherein said sleeve holder is movable axially between retracted and extended positions, with the jaws of the sleeve holder opening radially when the sleeve holder is extended and closing radially when the sleeve holder is retracted, and wherein in use the mandrel is extended, the sleeve holder is extended to radially open said jaws, a sleeve is positioned on the small diameter portion of the mandrel, the rearward end of the sleeve is positioned against the front end of the sleeve stop, and then the sleeve holder is retracted to close the jaws, bringing them into gripping engagement with the sleeve.

18. Apparatus according to claim 17, wherein the rear portion of the sleeve holder includes a piston which is a part of a piston-cylinder unit in the puller tool which is operable to extend and retract the sleeve holder.

19. Apparatus according to claim 17, wherein the fingers of the sleeve holder diverge apart when the sleeve holder is in its extended position.

20. Apparatus according to claim 17, wherein the nose portion includes at least one radially inwardly projecting cam positioned in a slot between adjacent axial fingers, and wherein said axial fingers include cam surfaces which contact said cam when the sleeve holder is extended, and wherein said contact cams the fingers apart.

21. Apparatus according to claim 17, wherein the sleeve holder includes two diametrically opposed fingers separated by two diametrically opposed slots.

22. Apparatus according to claim 17, wherein the jaws have inner surfaces positioned radially outwardly of the end opening and axially forwardly of the front end of the sleeve stop, and wherein said split sleeve has a flared inner end which is positionable axially between said inner surfaces of the jaws and the front end of the sleeve stop.

23. Apparatus for radially expanding a sleeve, comprising:

a puller tool including an elongated tubular nose portion having an forward end;

an elongated tubular sleeve holder within said nose portion;

an elongated tubular sleeve stop within said sleeve holder, said sleeve stop having a forward end;

an elongated mandrel extending through said sleeve stop and including in order a rear end portion, a small diameter portion, an increasing diameter portion, and a maximum diameter portion;

said sleeve holder including a plurality of axial fingers separated by slots, said fingers having forward end portions which define a front end opening and sleeve gripping jaws radially outwardly bounding said end opening , said jaws being positioned axially forwardly of the front end of the sleeve stop;

said sleeve holder being movable axially between a retracted position, wherein said jaws are located at least partially within the nose portion and are radially contracted and an extended position wherein said jaws are positioned axially forwardly of the nose portion and are radially expanded;

a piston within the puller tool connected to the rear end of said mandrel, said piston being extendable and retractable for extending and retracting the mandrel;

said mandrel having an extended position in which a part of the small diameter portion of the mandrel and the increasing diameter and maximum diameter portions of the mandrel are positioned endwise forwardly of the tubular nose portion;

wherein in use the mandrel is extended and a sleeve to be expanded is positioned onto the small diameter portion of the mandrel outwardly of the front end of the sleeve stop; and wherein said piston is retractable to pull the mandrel through the sleeve while the sleeve holder is retracted and a rear end of the sleeve is against the front end of the sleeve stop.

24. Apparatus according to claim 23, wherein the rear portion of the sleeve holder includes a piston , wherein the puller tool includes a cylinder in which the piston is located, wherein the piston and cylinder form a first working chamber axially forwardly of the piston and a second working chamber axially rearwardly of the piston, wherein fluid pressure introduction into the first working chamber while the second working chamber is at a lower pressure moves the piston to retract the sleeve holder, and wherein pressure introduction into the second chamber while the first chamber is at lower pressure moves the piston to extend the sleeve holder.

25. Apparatus according to claim 23, wherein the fingers of the sleeve holder diverge apart when the sleeve holder is in its extended position.

26. Apparatus according to claim 23, wherein the nose portion includes at least one radially inwardly projecting cam positioned in a slot between adjacent axial fingers, and wherein said axial fingers include cam surfaces which contact said cam when the sleeve holder is extended, and wherein, said contact cams the fingers apart.

27. Apparatus according to claim 23, wherein the sleeve holder includes two diametrically opposed fingers separated by two diametrically opposed slots.

28. Apparatus according to claim 23, wherein the jaws have inner surfaces positioned radially outwardly of the end opening and axially forwardly of the front end of the sleeve stop, and wherein said sleeve is an axially split sleeve and has a flared rear end which is positionable axially between said inner surfaces of the jaws and the front end of the sleeve stop.

29. A puller tool for extending and retracting a mandrel, comprising:
   a housing including a forward portion in which a mandrel is guided for axial movement between retracted and extended positions;
   a first piston-cylinder unit within said housing including a first piston and first front and rear working chambers on opposite sides of the piston, and a mandrel mount connected to the piston, said mandrel mount including a front end portion that is connectable to a rear end portion of a mandrel;
   a passageway leading into the first front working chamber, through which pressure is introduced for retracting the piston and in turn retracting a mandrel connected to the piston;
   said first rear working chamber being defined in part by a radial wall, said radial wall including an axial opening;
   a second piston-cylinder unit positioned substantially rearwardly of said radial wall, and including a second piston and a second front working chamber and a second rear working chamber on opposite sides of the second piston, and a piston rod connected to the second piston and extending forwardly through the front forward working chamber and through the opening in the radial wall, said piston rod including a front end within the rear working chamber of the first piston-cylinder unit;
   wherein fluid pressure can be introduced into the second rear working chamber, against the second piston, to extend the second piston and its piston rod, and move the piston rod into contact with the first piston; and
   wherein said second piston has a predetermined stroke length and extension of said second piston will extend the first piston, the mandrel holder and the mandrel a predetermined distance, causing a predetermined length of the mandrel to be extended out from the forward portion of the housing.

30. A puller tool according to claim 29, wherein the first rear working chamber and the second front working chamber are interconnected.

31. A puller tool according to claim 30, wherein the first rear working chamber and the second front working chamber are interconnected by a passageway which extends through the radial wall.

32. A puller tool according to claim 29, wherein said housing includes a forward portion comprising a body portion and a nose portion, said body portion including a piston cavity having a front end and a rear end, said front end including a central opening surrounded by an annular end wall;
   said nose portion including a central passageway extending forwardly from said central opening, said central passageway including a front end;
   a tubular sleeve holder including a piston within said piston cavity and a tubular front portion extending forwardly from the piston through the central passageway, said piston including an annular front surface confronting the front end wall of the cavity, and a rear surface;
   said tubular front portion of the sleeve holder including a plurality of axial fingers separated by axial slots, said fingers having front end portions which define a front end opening and sleeve gripping jaws radially outwardly bounding said end opening;
   passages for delivering fluid pressure to the rear of the piston while the front of the piston is at low pressure, to extend the sleeve holder, and to deliver fluid pressure to the front of the piston while the rear of the piston is at low pressure, to retract the sleeve holder;
   wherein the fingers of the sleeve holder diverge apart when the sleeve holder is in its extended position; and
   wherein the nose portion of the puller tool contracts the fingers and forces them radially inwardly, and the jaws radially together, When the sleeve holder is retracted.

33. A puller tool for pulling a mandrel, comprising:
   an elongated tubular housing including a forward portion having a base portion and a nose portion, said base portion including a piston cavity having a forward end and a rearward end, said forward end including a central opening surrounded by an annular radial end wall;
   said nose portion including a central passageway extending forwardly from said central opening, said central passageway including a forward end;
   a tubular sleeve holder including a piston within said piston cavity and a tubular front portion extending forwardly from the piston through the central passageway, said piston including an annular front surface confronting the forward end wall of the cavity, and a rear surface;
   said tubular front portion of the sleeve holder including a plurality of axial fingers separated by axial slots, said fingers having front end portions which define a front end opening and sleeve gripping jaws radially outwardly bounding said end opening;
   passages for delivering fluid pressure to the rear of the piston while the front of the piston is at low pressure, to extend the sleeve holder, and to deliver fluid to pressure to the front of the piston to retract the sleeve holder; wherein the fingers of the sleeve holder diverge apart when the sleeve holder is in its extended position, and
   wherein the nose portion of the puller tool contracts the fingers and forces them radially inwardly, and the jaws radially together when the sleeve holder is retracted.

34. A puller tool according to claim 33, wherein the elongated tubular housing includes a rear portion rearwardly of the forward portion and said forward portion is detachably secured to said rear portion.

35. A puller tool according to claim 33, further comprising a tubular sleeve stop, said sleeve stop including a radial rear base and a straight tubular body extending forwardly from said base through said tubular sleeve holder, said radial rear end wall defining the end wall of the piston cavity.

36. A puller tool for pulling a mandrel, comprising:
   an elongated tubular housing including a forward portion comprising a body portion and a nose portion, said body portion including a piston cavity having a forward end and a rearward end, said forward end including a central opening surrounded by an annular radial end wall;

said nose portion including a central passageway extending forwardly from said central opening, said central passageway including a forward end;

a tubular sleeve holder within said forward portion of said housing, including a piston within said piston cavity and a tubular front portion extending forwardly from the piston through the central passageway, said piston including an annular front surface confronting the forward end wall of the cavity, and a rear surface;

said tubular front portion of the sleeve a plurality of axial fingers separated by axial slots, said fingers having outer end portions which define an outer end opening and sleeve gripping jaws radially outwardly bounding said outer end opening;

passages for delivering fluid pressure to the rear of the piston while the front of the piston is at low pressure, to extend the sleeve holder, and to deliver fluid pressure to the front of the piston while the rear of the piston is at low pressure, to retract the sleeve holder;

wherein the fingers of the sleeve holder diverge apart when the sleeve holder is in its extended position, and wherein the nose portion of the puller tool contracts the fingers and forces them radially inwardly, and the jaws radially together, when the sleeve holder is retracted.

37. A puller tool according to claim 36, comprising a radial wall in the body portion, rearwardly of the rearward end of the piston cavity.

38. A puller tool according to claim 37, wherein said radial wall includes a central mandrel receiving opening.

39. A puller tool according to claim 34, comprising a radial wall in the body portion, rearwardly of the rearward end of the piston cavity.

40. A method of cold expanding a hole in a workpiece, comprising:

providing a cold expansion mandrel which includes a rear end, a small diameter portion axially forwardly of said rear end, an increasing diameter portion axially outwardly of said small diameter portion and a maximum diameter portion axially outwardly of said in creasing diameter portion;

providing a puller tool which is adapted to extend and retract the cold expansion mandrel, and connecting the rear end of the mandrel to the puller tool;

providing the puller tool with a tubular sleeve stop in a surrounding relationship to the mandrel, said sleeve stop including a forward end;

providing the puller tool with a sleeve holder in a surrounding relationship to the sleeve stop, said sleeve holder being extendable and retractable independently of the mandrel and including a forward end portion divided by axial slots into axial fingers, with the front end portions of the fingers defining a sleeve and mandrel receiving end opening and sleeve retaining jaws radially outwardly bounding the end opening;

providing the puller tool with a tubular nose portion in a surrounding relationship to said sleeve holder, said nose portion being adapted to engage and radially contract the jaws of the sleeve holder in response to a retraction of the sleeve holder;

extending the sleeve holder axially out from said nose portion to radially expand said jaws;

extending the mandrel to position a part of the small diameter portion of the mandrel endwise forwardly of the end opening and the sleeve engaging jaws;

providing a prelubricated cold expansion, one-piece sleeve and positioning such sleeve in a stationary and supported position;

moving the puller tool to the sleeve to put the mandrel into axial alignment with the sleeve and then moving the puller tool axially to move the mandrel through the sleeve until the sleeve is on the small diameter portion of the mandrel and a rear end of the sleeve is against the front end of the sleeve stop;

retracting the sleeve holder to contract the jaws sleeve holder into gripping contact with the inner end portion of the sleeve;

moving the puller tool to a workpiece and aligning the mandrel and sleeve with a hole in the workpiece and moving the puller tool axially to place the mandrel and sleeve into the hole in the workpiece and place outer end surfaces of the jaws of the sleeve holder into contact with the workpiece where it surrounds the hole in the workpiece;

holding the end surfaces of the jaws against the workpiece while retracting the mandrel to move the mandrel through the sleeve, so that as the mandrel is retracted the increasing and maximum diameter portions of the mandrel will expand the sleeve radially to cold expand the workpiece material surrounding the hole in the workpiece;

following retraction of the mandrel, moving the puller tool away from the workpiece while maintaining the sleeve holder in a retracted position, so that the jaws of the sleeve holder will hold onto the sleeve and pull it out from the hole in the workpiece as the puller tool is moving away from the workpiece;

extending the sleeve holder to move the jaws axially outwardly from the nose portion, and expanding the jaws to remove their grip from the sleeve; and extending the mandrel while the jaws are expanded, to move the mandrel against the sleeve, so that the mandrel will push the sleeve out from the end opening and free of the sleeve holder.

41. The method of claim 40, comprising providing the puller tool with a fluid pressure operated linear actuator connected to the sleeve holder, and delivering fluid pressure to the actuator for extending and retracting the sleeve holder.

42. The method of claim 40, including mounting the puller tool onto a guide rail which is parallel to the mandrel for axial movement, and moving the guide rail to place the mandrel in axial alignment with the sleeve, and moving the puller tool axially along the rail to insert the mandrel into and through the sleeve.

43. The method of claim 42, including moving the rail to in turn move the puller tool to align the mandrel with the hole in the workpiece, and moving the tool axially along the rail to insert the mandrel and sleeve into the hole in the workpiece.

44. The method of claim 43, comprising retracting the puller tool axially along the guide rail to move the mandrel away from the workpiece and pull the sleeve out from the hole in the workpiece.

45. The method of claim 40, including mounting the puller tool onto a guide rail which is parallel to the mandrel, and moving the rail to in turn move the puller tool to align the mandrel with the hole in the workpiece, and moving the tool axially along the rail to insert the mandrel and sleeve into the hole in the workpiece.

46. The method of claim 45, comprising retracting the puller tool axially along the guide rail to move the mandrel away from the workpiece and pull the sleeve out from the hole in the workpiece.

47. A method of radially expanding a tubular sleeve, comprising:

providing a mandrel which includes a rear end portion, a small diameter portion axially outwardly of said rear end portion, an in creasing diameter portion axially outwardly of said small diameter and a maximum diameter portion axially outwardly of said in creasing diameter portion;

providing a puller tool which is adapted to extend and retract the mandrel, and connecting the rear end portion of the mandrel to the puller tool;

providing the puller tool with a tubular sleeve stop in a surrounding relationship to the mandrel, said sleeve stop including a front end;

providing the puller tool with a sleeve holder in a surrounding relationship to the sleeve stop, said sleeve holder being extendible and retractable independently of the mandrel and including a front end portion divided by axial slots into axial fingers, with the front end portions of the fingers defining a sleeve and mandrel receiving end opening and sleeve retaining jaws radially outwardly bounding the end opening;

providing the puller tool with a tubular nose portion in a surrounding relationship to said sleeve holder, said nose portion being adapted to engage and radially contract the jaws of the sleeve holder in response to a retraction of the sleeve holder;

extending the sleeve holder axially out from said nose portion to radially expand said jaws;

extending the mandrel to position a part of the small diameter portion of the mandrel endwise outwardly of the end opening and the sleeve engaging jaws;

providing a sleeve on the small diameter portion of the mandrel, outwardly of the end opening and the sleeve engaging jaws and moving the sleeve relatively along the mandrel until a rear end of the sleeve is against the front end of the sleeve stop;

retracting the sleeve holder to contract the jaws of the sleeve holder into gripping contact with the inner end portion of the sleeve;

moving the puller tool to a member which includes an opening and inserting the mandrel and sleeve into such opening; and retracting the mandrel through the sleeve so that as the mandrel is retracted the increasing and maximum diameter portions of the mandrel will expand the sleeve radially.

48. The method of claim 47, wherein the sleeve is a prelubricated, one-piece sleeve.

49. The method of claim 47, comprising positioning the sleeve in a stationary and supported position, moving the puller tool to the sleeve to put the mandrel into axial alignment with the sleeve, and then moving the puller tool axially to move the mandrel through the sleeve until the sleeve is on the small diameter portion of the mandrel and a rear end of the sleeve is against the front end of the sleeve stop.

50. The method of claim 47, comprising, following retraction of the mandrel, moving the puller tool while maintaining the sleeve holder in a retracted position, so that the jaws of the sleeve holder will hold onto the sleeve and the sleeve will be moved with the puller tool.

51. The method of claim 50, comprising, following the moving of the puller tool and sleeve, extending the sleeve holder to move the jaws axially outwardly from the nose portion, and expanding the jaws to remove their grip from the sleeve.

52. The method of claim 51, comprising, following extension of the sleeve holder and expansion of the jaws, extending the mandrel while the jaws are expanded, to move the mandrel against the sleeve, so that the mandrel will push the sleeve out from the end opening and free of the sleeve holder.

53. The method of claim 52, comprising providing the puller tool with a fluid pressure operated linear actuator connected to the sleeve holder, and delivering fluid pressure to the actuator for extending and retracting the sleeve holder.

54. Apparatus for delivering cold expansion sleeves to a holding station, into a position to be picked up by a puller gun, each said sleeve having a front end and a rear end, said apparatus comprising:

a housing defining a longitudinal passageway into which a series of cold expansion sleeves are moved, sideways to the sleeve holding station;

said passageway including a longitudinal cam surface confronting the front ends of the sleeves;

said cam surface being configured to contact the front end of each sleeve as the sleeve approaches the holding station, and push such sleeve axially rearwardly; and said housing including a window through which a rear portion of each sleeve extends when it is at the holding station.

55. Apparatus according to claim 54, including a cradle at the holding station positioned to engage a side portion of each sleeve when it reaches the holding station.

56. Apparatus according to claim 54, further comprising a sleeve carrier, said sleeve carrier including an elongated web and pairs of tabs spaced apart along the web, each pair of tabs extending perpendicular from the web in the same direction, and an opening in each tab aligned with the opening in the other tab of its pair, with each cold expansion sleeve extending through the openings in a said pair of tabs, and being frictionally retained in said openings.

57. Apparatus according to claim 56, wherein said longitudinal passageway includes a guide channel for the carrier in which the web of the carrier is received.

58. Apparatus according to claim 54, further including a sleeve advance mechanism comprising a support mounted adjacent said housing for movement longitudinally of said housing, drive means for extending said support towards said holding station, and retracting it away from said holding station, an advance finger mounted on said support for pivotal movement about a pivot axis, said advance finger including a first end portion extending from the pivot axis generally into the longitudinal passageway, and a second end portion extending in the opposite direction from the pivot axis, said support including a stop positioned to be contacted by the second end portion of the advance finger, and a spring normally biasing the advance finger into a position against said stop, wherein when said second end portion of the advance finger is against said stop the said first end portion of the advance finger extends laterally across the longitudinal passageway, wherein a retraction of said support will move the first end portion of the advance finger against a sleeve in the longitudinal passageway one step from the holding station, and in response to such contact the advance finger will rotate in position, to allow the first end portion of the advance finger to clear the sleeve, and cause the second end portion of the advance finger to rotate up off of the stop against the force of the spring, and wherein following the first end portion of the advance finger clearing the sleeve, the spring will move the advance finger back into a position with the first end portion of the advance finger spanning across the longitudinal passageway and the second end portion of the advance finger against the stop, and wherein when the support is next extended the first end portion of the advance finger will contact such sleeve and will move such sleeve to the sleeve holding station.

* * * * *

UNITED STATES PATENT AND TRADEMARK OFFICE
CERTIFICATE OF CORRECTION

PATENT NO. : 5,305,627
DATED : April 26, 1994
INVENTOR(S) : Darryl E. Quincey et al It is certified that error appears in the above-indentified patent and that said Letters Patent is hereby corrected as shown below:

Column 1, line 10, "old" should be -- cold --.

Column 1, lines 37 and 66, "in creasing" should be -- increasing --.

Column 2, line 23, after "detail", insert -- in --.

Column 2, line 63, "Wherein" should be -- wherein --.

Column 3, line 29, "be cause" should be -- because --.

Column 5, line 36, there is a period after "stop".

Column 5, line 66, "Eaoh" should be -- Each --.

Column 7, line 40, "out" should be -- cut --.

Column 8, line 36, "et o." should be -- etc. --.

Column 9, line 28, "s crew" should be -- screw --.

Column 9, line 37, "Which" should be -- which --.

Column 9, line 58, "Which are Wider" should be -- which are wider --.

Column 10, line 6, "flare 28" should be -- flare 128 --.

Column 11, line 30, "With" should be -- with --.

Column 12, line 52, "Surfaoe" should be -- Surface --.

UNITED STATES PATENT AND TRADEMARK OFFICE
CERTIFICATE OF CORRECTION

PATENT NO. : 5,305,627
DATED : April 26, 1994
INVENTOR(S) : Darryl E. Quincey et al It is certified that error appears in the above-indentified patent and that said Letters Patent is hereby corrected as shown below:

Claim 1, column 17, line 41, after "connected to the", insert -- rear end --.

Claim 32, column 22, line 21, "When" should be -- when --.

Claim 33, column 22, line 48, "wherein the fingers" begins a new paragraph.

Claim 36, column 23, line 14, after "sleeve", insert -- holder including --.

Claim 39, column 23, line 39, "claim 34" should be -- claim 36 --.

Claim 40, column 23, line 49, "in creasing" should be -- increasing --.

Claim 40, column 24, line 17, after "the jaws", insert -- of the --.

UNITED STATES PATENT AND TRADEMARK OFFICE
CERTIFICATE OF CORRECTION

PATENT NO. : 5,305,627

DATED : April 26, 1994

INVENTOR(S) : Darryl E. Quincey et al

It is certified that error appears in the above-indentified patent and that said Letters Patent is hereby corrected as shown below:

Claim 47, column 25, lines 15 and 18, "in creasing" should be ---increasing---.

Signed and Sealed this

Fourth Day of October, 1994

BRUCE LEHMAN

Attest:

Attesting Officer

Commissioner of Patents and Trademarks